(12) United States Patent
Astely et al.

(10) Patent No.: US 9,894,654 B2
(45) Date of Patent: Feb. 13, 2018

(54) DEFINING SUB-SUBCHANNELS FOR DATA COMMUNICATION USING SEPARATELY PROVIDED FREQUENCY AND TIME RESOURCES AND RELATED WIRELESS TERMINALS AND NETWORK NODES

(71) Applicant: Telefonaktiebolaget LM Ericsson (publ), Stockholm (SE)

(72) Inventors: David Astely, Bromma (SE); Stefan Parkvall, Bromma (SE); Helka-Liina Määttanen, Helsinki (FI); Niklas Andgart, Södra Sandby (SE); Mattias Andersson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 88 days.

(21) Appl. No.: 15/031,162

(22) PCT Filed: Feb. 17, 2016

(86) PCT No.: PCT/EP2016/053333
§ 371 (c)(1),
(2) Date: Apr. 21, 2016

(87) PCT Pub. No.: WO2016/142136
PCT Pub. Date: Sep. 15, 2016

(65) Prior Publication Data
US 2017/0251466 A1    Aug. 31, 2017

Related U.S. Application Data

(60) Provisional application No. 62/130,312, filed on Mar. 9, 2015, provisional application No. 62/130,200, filed
(Continued)

(51) Int. Cl.
*H04W 4/00* (2009.01)
*H04W 72/04* (2009.01)
*H04L 5/00* (2006.01)

(52) U.S. Cl.
CPC ....... *H04W 72/0446* (2013.01); *H04L 5/0055* (2013.01); *H04W 72/042* (2013.01)

(58) Field of Classification Search
None
See application file for complete search history.

(56) References Cited

U.S. PATENT DOCUMENTS 6,542,736 B1 * 4/2003 Parkvall ............... H04W 28/20
370/465
8,873,504 B2   10/2014 Zancho et al.
(Continued)

FOREIGN PATENT DOCUMENTS

| EP | 2 773 160 A1 | 9/2014 |
|---|---|---|
| WO | 2006/105005 | 10/2006 |
| WO | 2014/110467 | 7/2014 |

OTHER PUBLICATIONS

International Search Report and Written Opinion of the International Searching Authority, Application No. PCT/EP2016/053333, Apr. 14, 2016.
(Continued)

*Primary Examiner* — Farah Faroul
(74) *Attorney, Agent, or Firm* — Sage Patent Group

(57) ABSTRACT

Methods may be provided to operate a network node of a radio access network. Such methods may include transmitting first control information to a wireless terminal, and the first control information may define a frequency resource available for data communication with the wireless terminal over a subframe. After transmitting the first control information, second control information may be transmitted to the wireless terminal. The second control information may
(Continued)

define a time resource for a sub-subframe of the subframe. Communication of data may be provided between the network node and the wireless terminal during the sub-subframe of the subframe defined by the frequency resource of the first control information and the time resource of the second control information. Related network nodes and wireless terminals are also discussed.

31 Claims, 12 Drawing Sheets

Related U.S. Application Data on Mar. 9, 2015, provisional application No. 62/130,127, filed on Mar. 9, 2015.

(56) References Cited

U.S. PATENT DOCUMENTS

| | | | | |
|---|---|---|---|---|
| 9,762,357 | B2* | 9/2017 | Maattanen | H04L 1/1812 |
| 2008/0043650 | A1* | 2/2008 | Jang | H04W 72/0453 |
| | | | | 370/310 |
| 2009/0116427 | A1* | 5/2009 | Marks | H04L 5/0007 |
| | | | | 370/328 |
| 2010/0189047 | A1* | 7/2010 | Baum | H04B 7/024 |
| | | | | 370/329 |
| 2010/0248767 | A1* | 9/2010 | Kim | H04W 28/16 |
| | | | | 455/509 |
| 2013/0039291 | A1 | 2/2013 | Blankenship et al. | |
| 2013/0142179 | A1 | 6/2013 | Jung et al. | |
| 2014/0269593 | A1* | 9/2014 | Wang | H04W 72/12 |
| | | | | 370/329 |
| 2015/0358111 | A1 | 12/2015 | Marinier et al. | |
| 2016/0165622 | A1 | 6/2016 | Luo et al. | |
| 2016/0227496 | A1* | 8/2016 | Panteleev | H04W 36/0055 |
| 2016/0337105 | A1* | 11/2016 | Lawton | H04L 5/0057 |
| 2017/0013618 | A1* | 1/2017 | Shin | H04W 72/0446 |
| 2017/0041103 | A1* | 2/2017 | Maattanen | H04L 1/1671 |
| 2017/0105206 | A1* | 4/2017 | Maattanen et al. | H04W 72/0406 |
| 2017/0142712 | A1* | 5/2017 | Lee | H04W 72/0446 |
| 2017/0155486 | A1* | 6/2017 | Park | H04L 5/0048 |
| 2017/0156148 | A1* | 6/2017 | Park | H04L 5/0048 |
| 2017/0188340 | A1* | 6/2017 | Andgart | H04W 72/042 |
| 2017/0230994 | A1* | 8/2017 | You | H04L 5/00 |
| 2017/0257231 | A1* | 9/2017 | Park | H04L 25/03 |
| 2017/0265181 | A1* | 9/2017 | Patel | H04W 72/0413 |

OTHER PUBLICATIONS

3GPP, Technical Specification—"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.4.1 (Dec. 2014), 410 pp.

3GPP, Technical Specification—"3rd Generation Partnership Project; Technical Specification Group Radio Access Network; Evolved Universal Terrestrial Radio Access (E-UTRA); Multiplexing and channel coding (Release 12)" 3GPP TS 36.212 V12.3.0 (Dec. 2014), 89 pp.

3GPP, "3rd Generation Partnership Project; Technical Specification Group Radio Access Network; Evolved Universal Terrestrial Radio Access (E-UTRA); Multiplexing and Channel Coding (Release 12)", 3GPP TS 36.212 V12.8.0 (Mar. 2016), Mar. 2016, pp. 1-95.

3GPP, Technical Specification, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.7.0 (Sep. 2015), 453 pp.

3GPP, Technical Specification, "3rd Generation Partnership Project; Technical Specification Group Radio Access Network; Evolved Universal Terrestrial Radio Access (E-UTRA); Multiplexing and Channel Coding (Release 12)", 3GPP TS 36.212 V12.6.0 (Sep. 2015), 95 pp.

* cited by examiner

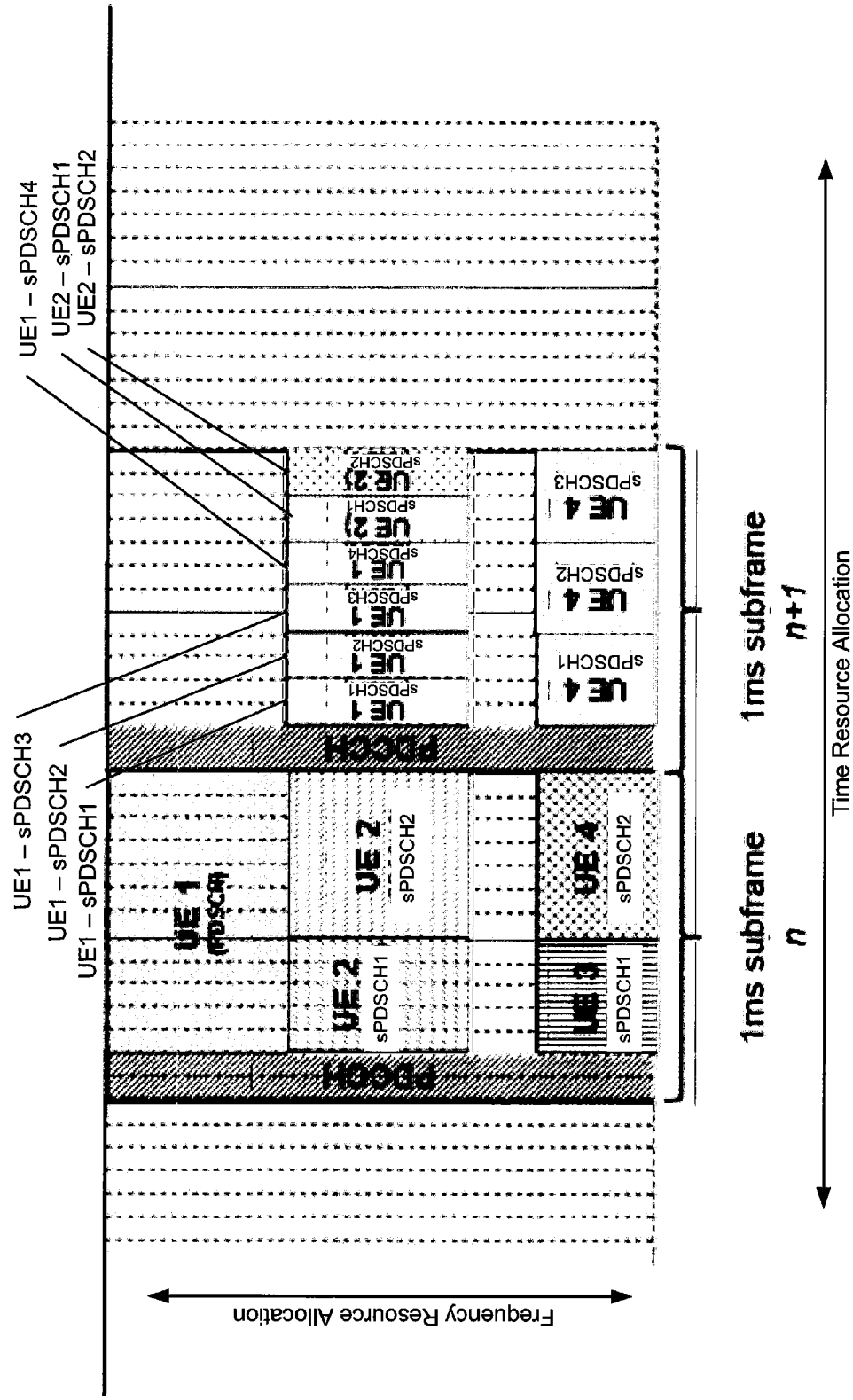

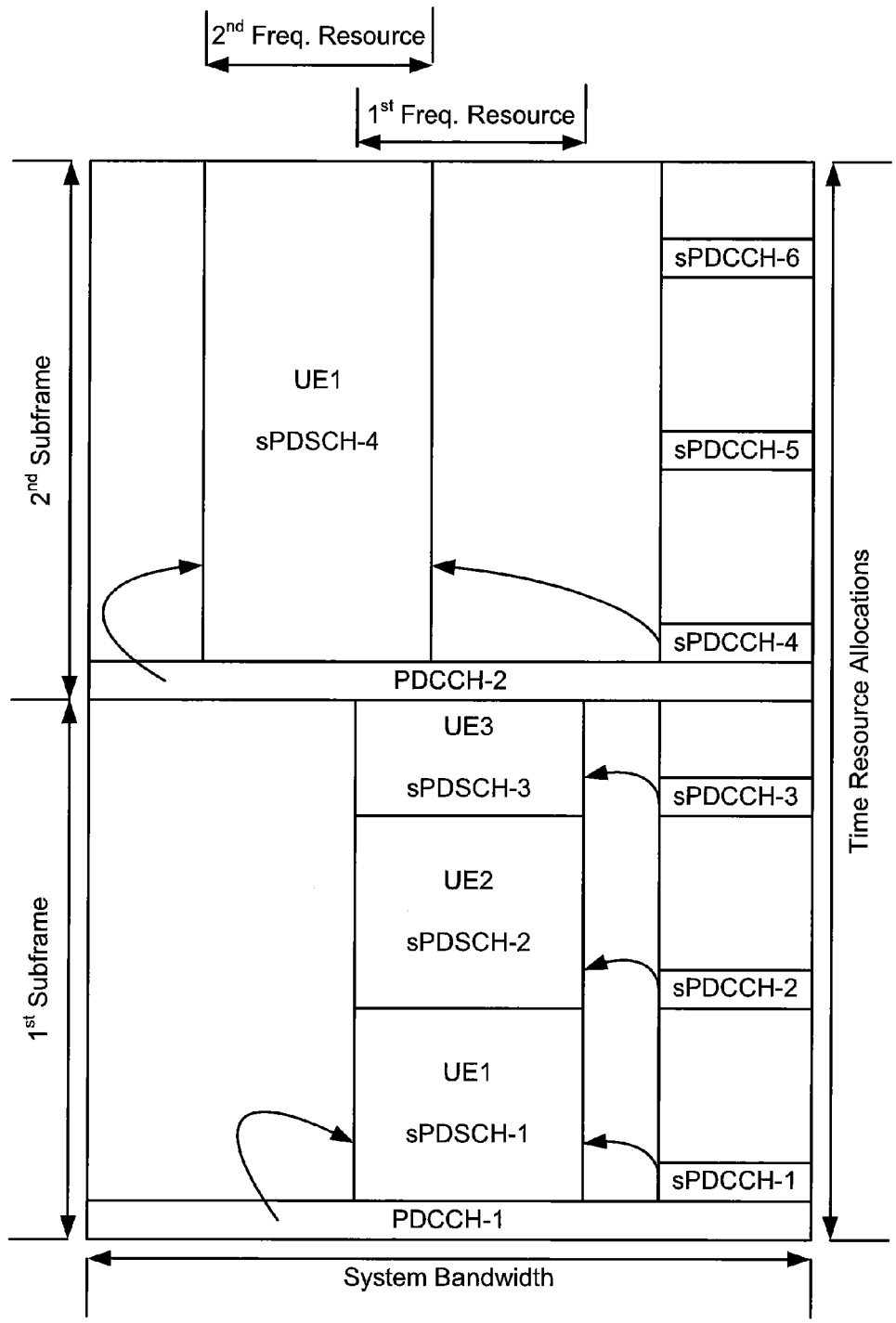

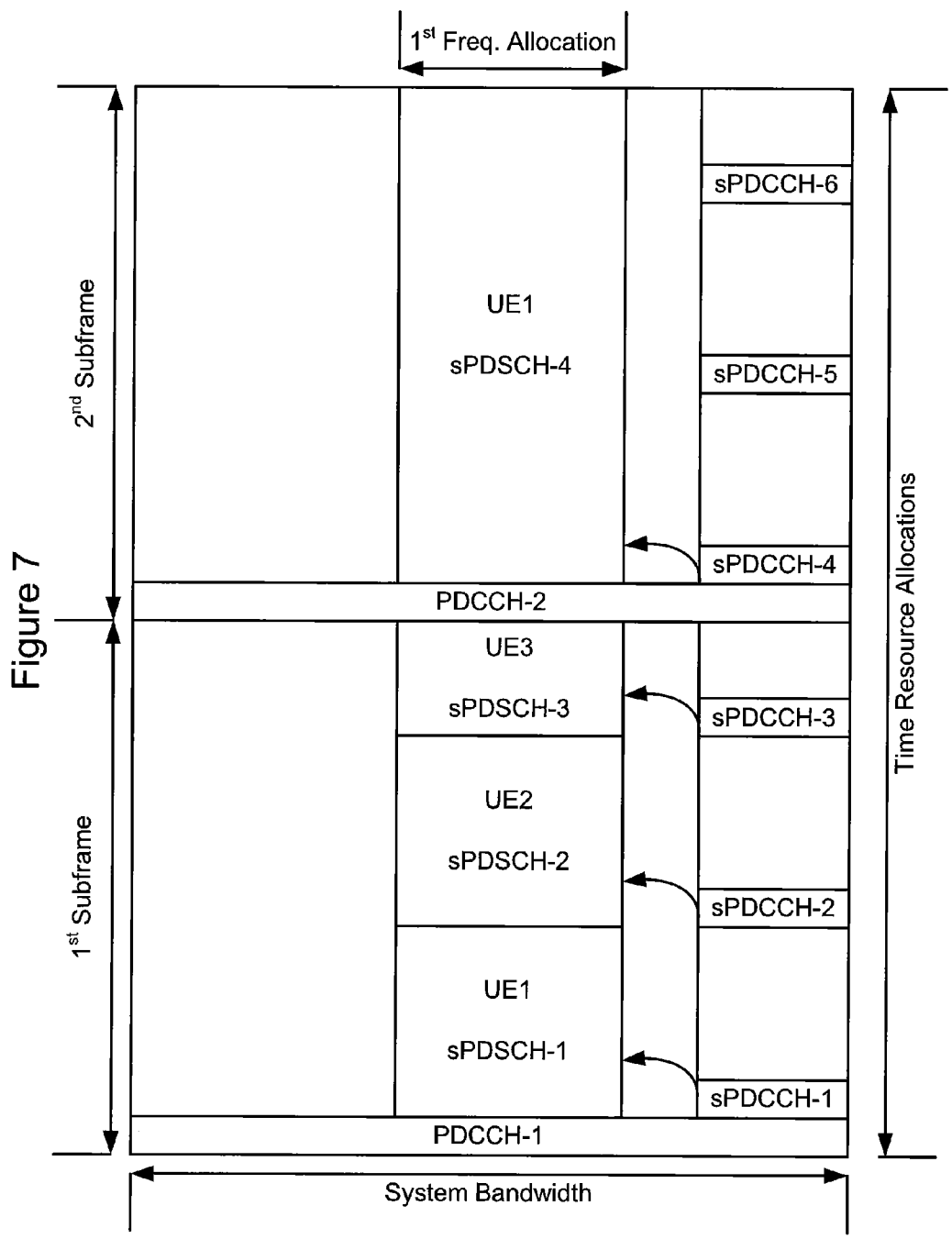

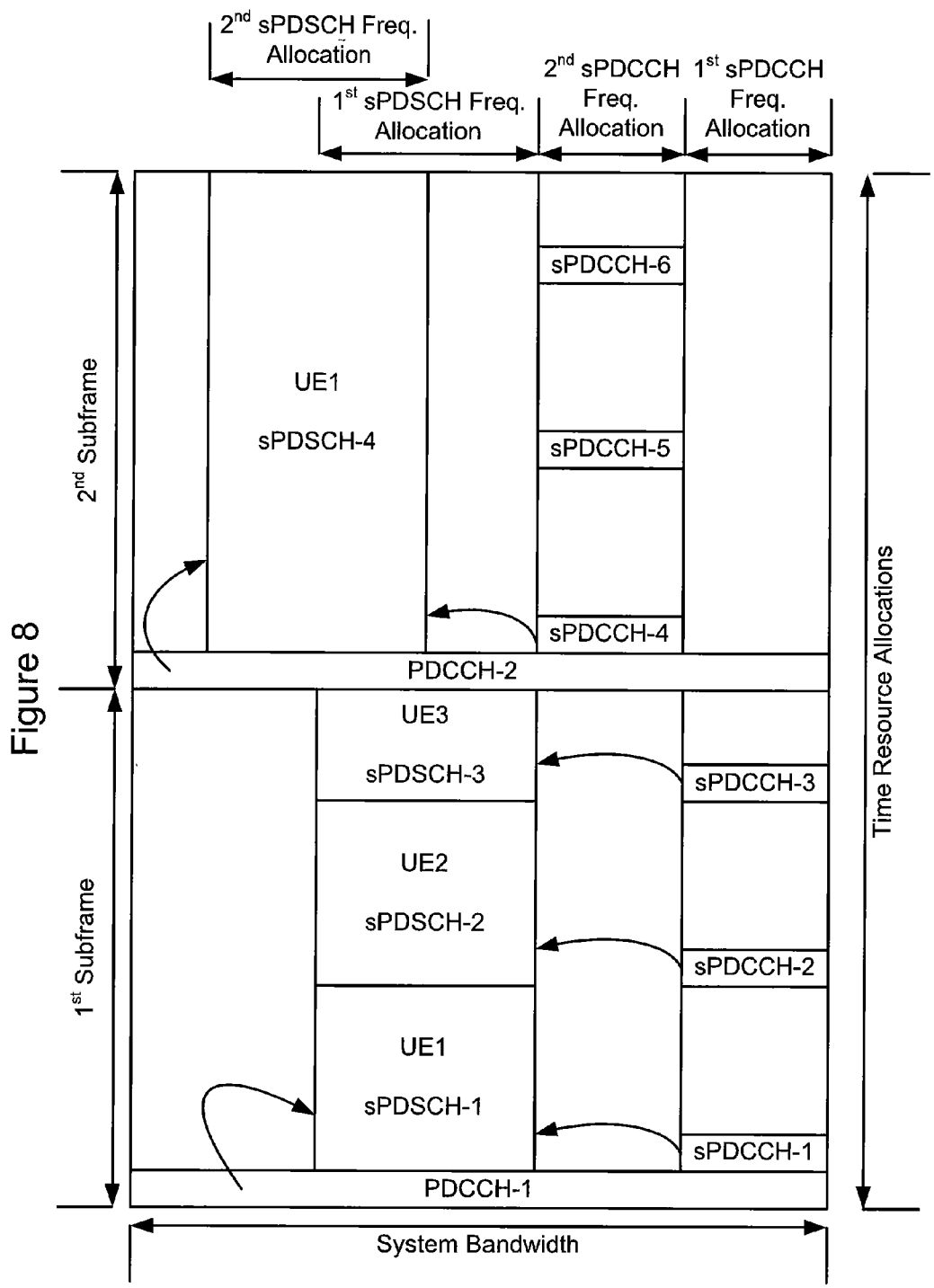

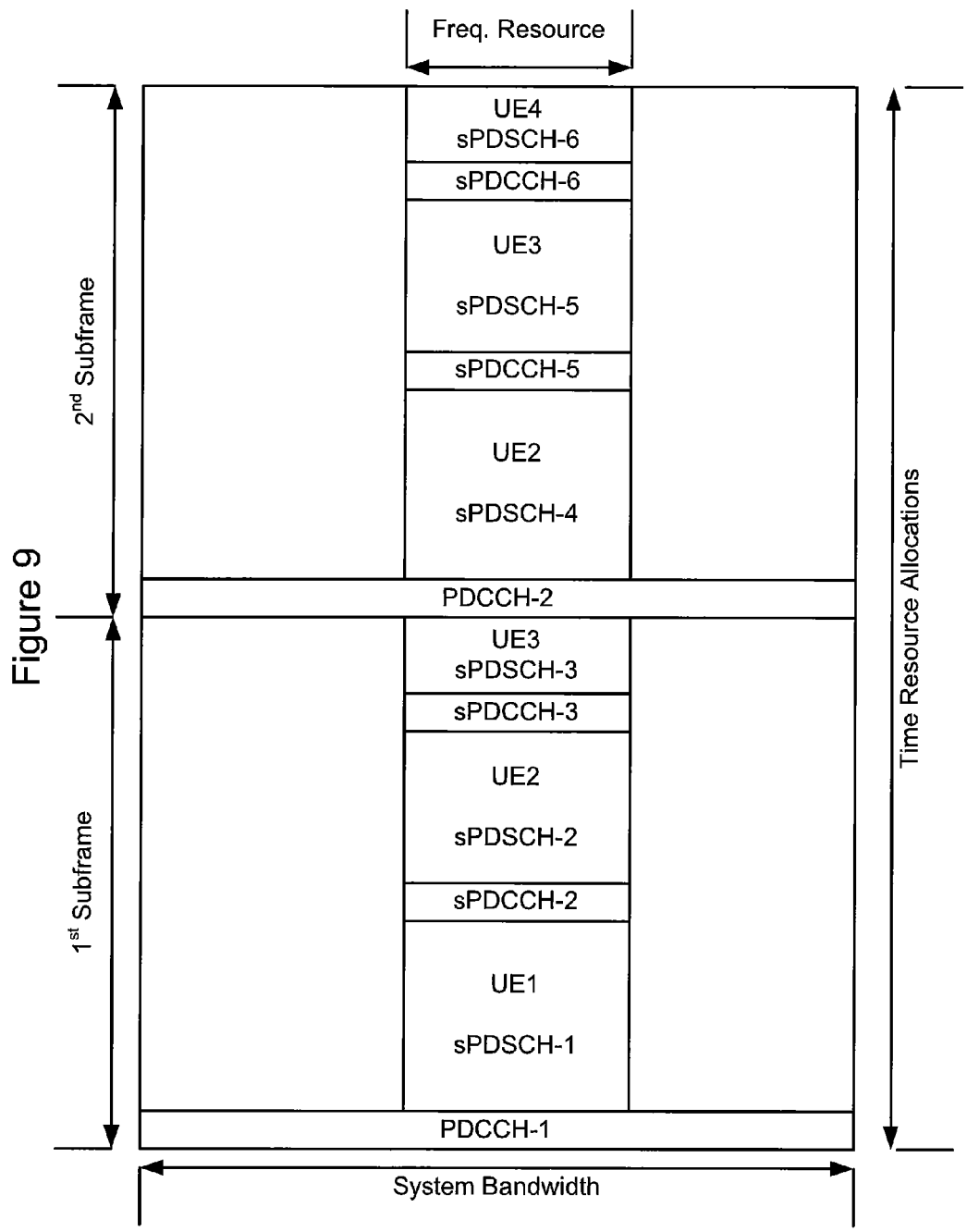

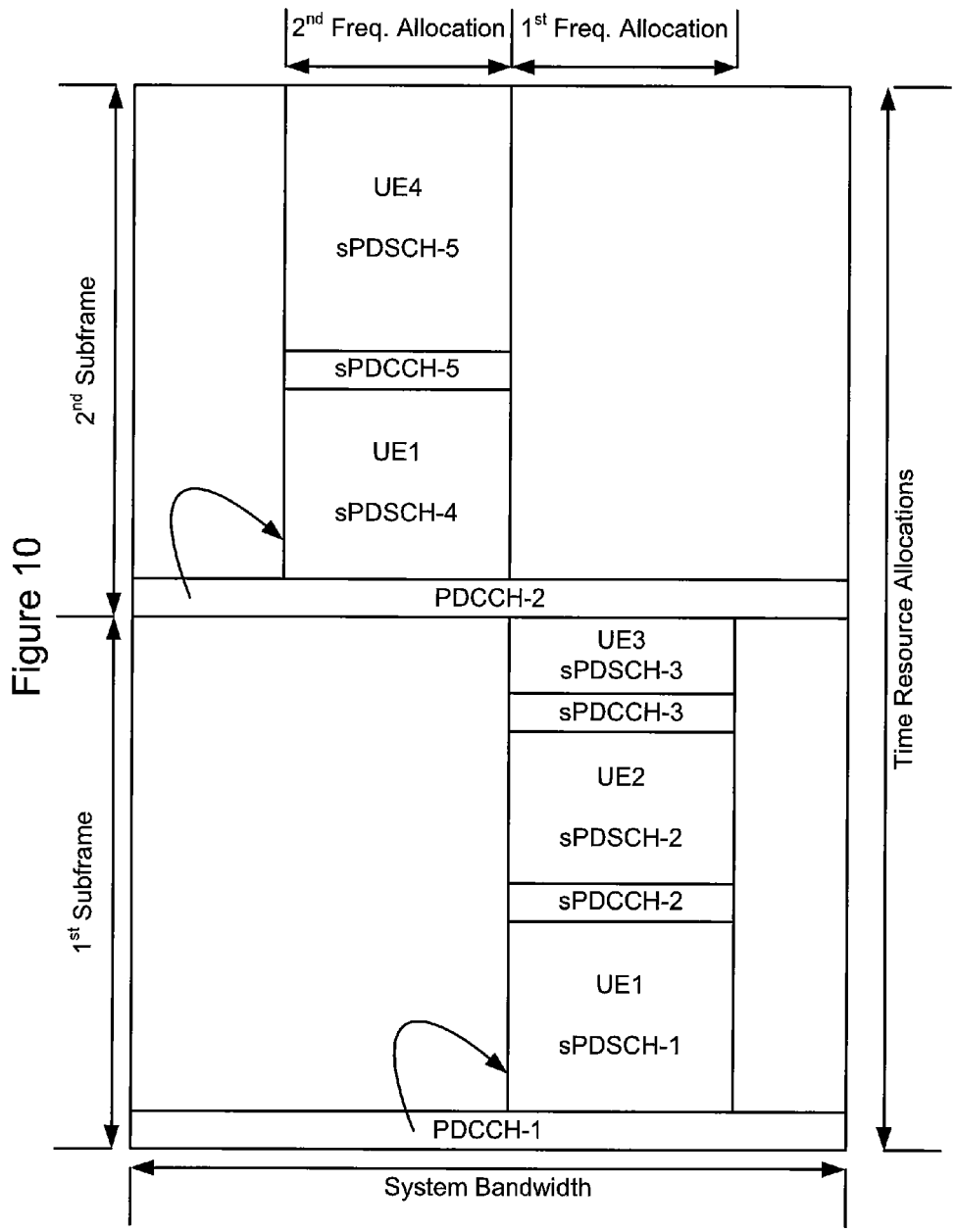

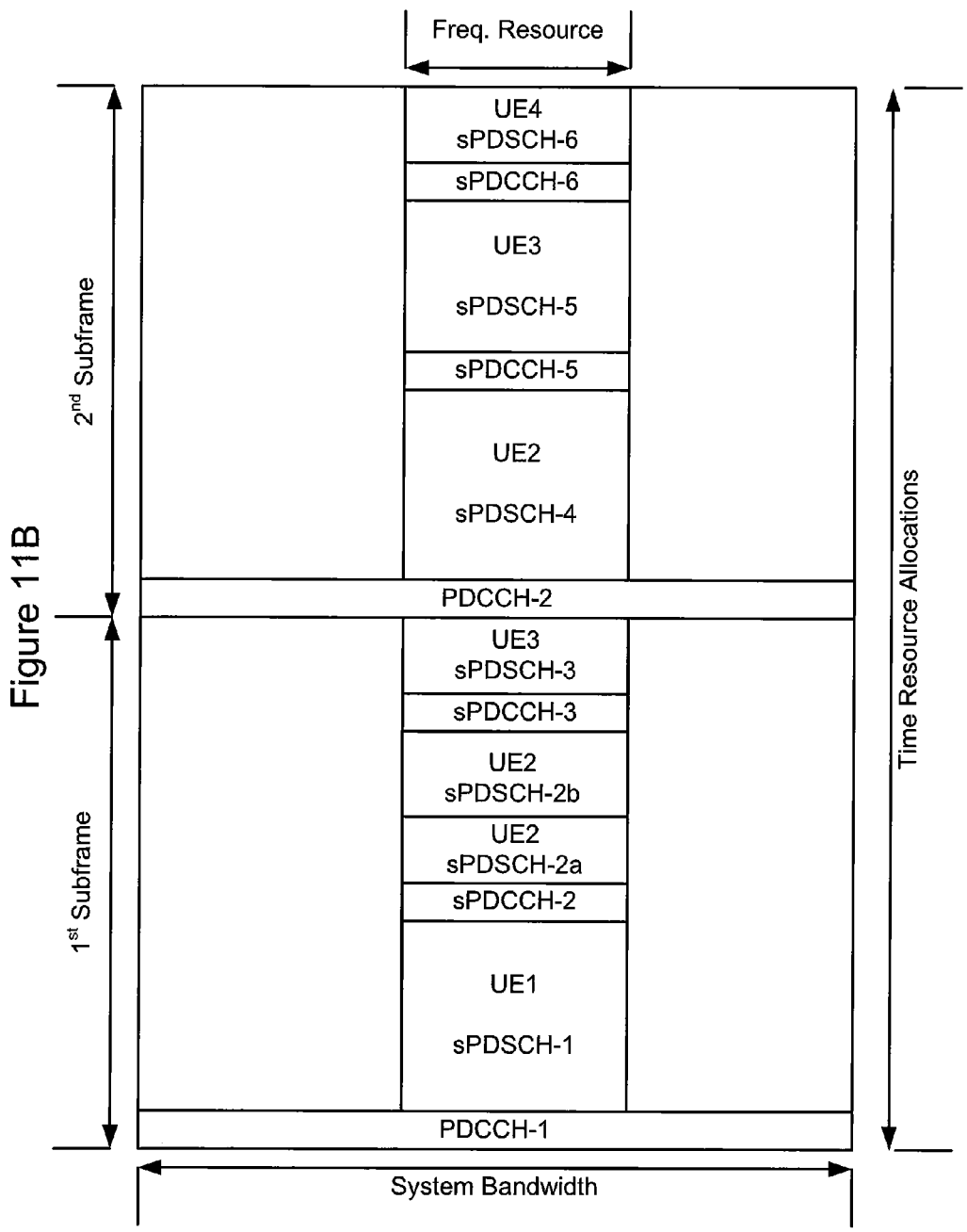

DEFINING SUB-SUBCHANNELS FOR DATA
COMMUNICATION USING SEPARATELY
PROVIDED FREQUENCY AND TIME
RESOURCES AND RELATED WIRELESS
TERMINALS AND NETWORK NODES

CROSS REFERENCE TO RELATED
APPLICATIONS

This application is a 35 U.S.C. § 371 national stage application of PCT International Application No. PCT/EP2016/053333, filed on Feb. 17, 2016, which itself claims priority to U.S. provisional Applications Nos. 62/130,312, 62/130,200 and 62/130,127, all filed Mar. 9, 2015, the disclosure and content of all of which are incorporated by reference herein in their entireties.

TECHNICAL FIELD

The present disclosure relates generally to wireless communications, and more particularly, to control information defining subframe structures for communication between network nodes and wireless terminals.

BACKGROUND

Packet data latency is a performance metric that vendors, operators, and end-users regularly measure (e.g., via speed test applications). Latency measurements may be performed in all phases of a radio access network system lifetime, for example, when verifying a new software release or system component, when deploying a system, and/or when the system is in commercial operation.

Improved latency relative to previous generations of $3^{rd}$ Generation Partnership Project (3GPP) Radio Access Technologies (RATs) was a performance metric that guided the design of Long Term Evolution (LTE). LTE is also now recognized by end-users to be a system that provides faster access to the Internet and lower data latencies than previous generations of mobile radio technologies.

In current LTE standards, a downlink (DL) subframe may have a 1 millisecond (ms) duration with 14 symbols. Notwithstanding such systems, further improvement in data latency may still be desired.

SUMMARY

According to some embodiments of present inventive concepts, a method of operating a network node of a radio access network may include transmitting first control information to a wireless terminal, and the first control information may define a frequency resource available for data communication with the wireless terminal over a subframe. After transmitting the first control information, second control information may be transmitted to the wireless terminal, and the second control information may define a time resource for a sub-subframe of the subframe. Communication of data may be provided between the network node and the wireless terminal during the sub-subframe of the subframe defined by the frequency resource of the first control information and the time resource of the second control information.

According to some other embodiments of present inventive concepts, a method of operating a wireless terminal in communication with a radio access network may include receiving first control information from a network node of the radio access network, and the first control information may define a frequency resource available for data communication between the network node and the wireless terminal over a subframe. After receiving the first control information, second control information may be received from the network node, and the second control information may define a time resource for a sub-subframe of the subframe. Communication of data may be provided between the wireless terminal and the network node during the sub-subframe of the subframe defined by the frequency resource of the first control information and the time resource of the second control information.

According to still other embodiments of present inventive concepts, a network node of a radio access network may include a communication interface configured to provide communication with one or more wireless terminals over a radio interface, and a processor coupled with the communication interface. More particularly, the processor may be configured to transmit first control information to a wireless terminal, and the first control information may define a frequency resource available for data communication with the wireless terminal over a subframe. The processor may also be configured to transmit second control information to the wireless terminal after transmitting the first control information, and the second control information may define a time resource for a sub-subframe of the subframe. The processor may be further configured to provide communication of data between the network node and the wireless terminal during the sub-subframe of the subframe defined by the frequency resource of the first control information and the time resource of the second control information.

According to yet other embodiments of present inventive concepts, a wireless terminal may include a transceiver configured to provide radio communication with a radio access network over a radio interface, and a processor coupled with the transceiver. More particularly, the processor may be configured to receive first control information from a network node of the radio access network, wherein the first control information defines a frequency resource available for data communication between the network node and the wireless terminal over a subframe. The processor may also be configured to receive second control information from the network node after receiving the first control information, wherein the second control information may define a time resource for a sub-subframe of the subframe. The processor may be further configured to provide communication of data between the wireless terminal and the network node during the sub-subframe of the subframe defined by the frequency resource of the first control information and the time resource of the second control information.

According to more embodiments of present inventive concepts, a network node of a radio access network may be adapted to transmit first control information to a wireless terminal, and the first control information may define a frequency resource available for data communication with the wireless terminal over a subframe. After transmitting the first control information, the network node may be adapted to transmit second control information to the wireless terminal, and the second control information may define a time resource for a sub-subframe of the subframe. The network node may also be adapted to provide communication of data between the network node and the wireless terminal during the sub-subframe of the subframe defined by the frequency resource of the first control information and the time resource of the second control information.

According to further embodiments of present inventive concepts, a wireless terminal in communication with a radio access network may be adapted to receive first control information from a network node of the radio access network, and the first control information may define a frequency resource available for data communication between the network node and the wireless terminal over a subframe. After receiving the first control information, the wireless terminal may be adapted to receive second control information from the network node, and the second control information may define a time resource for a sub-subframe of the subframe. The wireless terminal may also be adapted to provide communication of data between the wireless terminal and the network node during the sub-subframe of the subframe defined by the frequency resource of the first control information and the time resource of the second control information.

According to still further embodiments of present inventive concepts, a network node of a radio access network may include a control information communication module and a data communication module. The control information communication module may be adapted to transmit first control information to a wireless terminal, with the first control information defining a frequency resource available for data communication with the wireless terminal over a subframe, and adapted to transmit second control information to the wireless terminal after transmitting the first control information, with the second control information defining a time resource for a sub-subframe of the subframe. The data communication module may be adapted to provide communication of data between the network node and the wireless terminal during the sub-subframe of the subframe defined by the frequency resource of the first control information and the time resource of the second control information.

According to yet further embodiments of present inventive concepts, a wireless terminal configured for communication with a radio access network may include a control information communication module and a data communication module. The control information communication module may be adapted to receive first control information from a network node of the radio access network, with the first control information defining a frequency resource available for data communication between the network node and the wireless terminal over a subframe, and adapted to receive second control information from the network node after receiving the first control information, with the second control information defining a time resource for a sub-subframe of the subframe. The data communication module may be adapted to provide communication of data between the wireless terminal and the network node during the sub-subframe of the subframe defined by the frequency resource of the first control information and the time resource of the second control information.

By providing separate control information for frequency resources and time resources within a subframe, scheduling decisions within a subframe may be enabled thereby reducing frame alignment delay and/or HARQ RTT. In addition or in an alternative, dynamic sharing of resources between wireless terminals using 1 ms subframes and wireless terminals using shorter sub-subframes may be enabled. Moreover, overhead for downlink control information may be reduced.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 5-10, 11A, and 11B are time-frequency diagrams illustrating examples of scheduling sub-subframes according to some embodiments of present inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN (Radio Access Network) that communicates over radio communication channels with wireless terminals (also referred to as UEs, user equipments, user equipment nodes, mobile terminals, wireless devices, etc.). It will be understood, however, that inventive concepts are not limited to such embodiments and may be embodied generally in any type of communication network. As used herein, a legacy or non-legacy wireless terminal (also referred to as a UE, user equipment, user equipment node, mobile terminal, wireless device, etc.) can include any device that receives data from and/or transmits data to a communication network, and may include, but is not limited to, a mobile telephone ("cellular" telephone), laptop/portable computer, pocket computer, hand-held computer, an M2M device, IoT (Internet of Things) device, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned system. Other wireless systems, including WCDMA, WiMax, UMB and GSM, may also benefit from exploiting ideas/concepts covered within this disclosure.

Also, note that terminology such as eNodeB (also referred to as a base station, eNB, etc.) and UE (also referred to as user equipment, user equipment node, wireless terminal, mobile terminal, wireless device, etc.) should be considering non-limiting.

Figure 1:
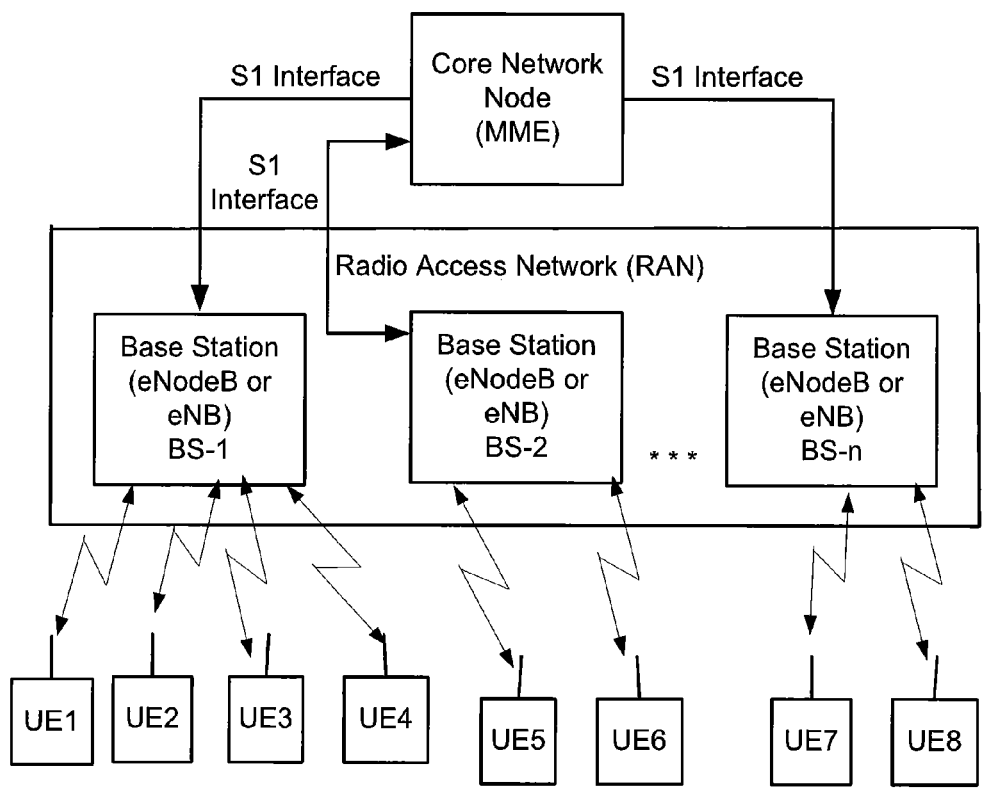
FIG. 1 is a block diagram illustrating base stations of a radio access network (RAN) in communication with wireless terminals and a core network node according to some embodiments of present inventive concepts.

FIG. 1 is a block diagram illustrating a Radio Access Network (RAN) according to some embodiments of present inventive concepts. As shown, communications between base stations and one or more core network nodes (e.g., Mobility Management Entity (MME) or Service GPRS Support Node SGSN) may be provided using respective S1 interfaces. Each base station BS may communicate over a radio interface (including uplinks and downlinks) with respective wireless terminals UEs in a respective cell or cells supported by the base station. By way of example, base station BS-1 is shown in communication with wireless terminals UE1, UE2, UE3, and UE4, base station BS-2 is shown in communication with wireless terminals UE5 and UE6, and base station BS-n is shown in communication with wireless terminals UE7 and UE8.

Figure 2:
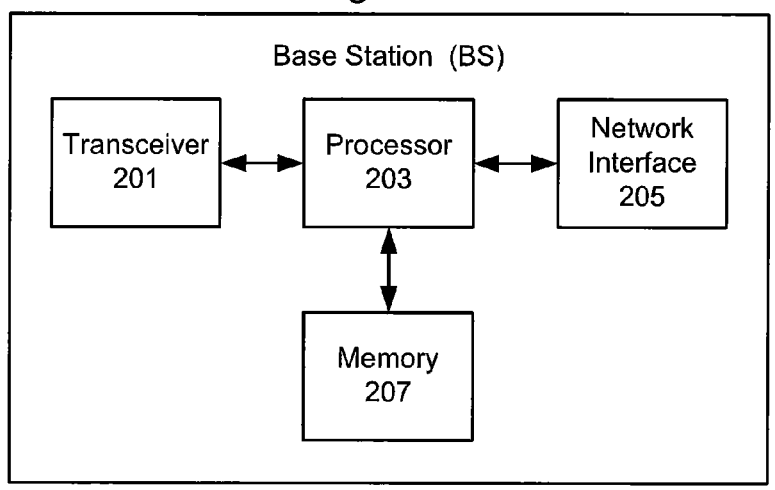
FIG. 2 is a block diagram illustrating a base station of FIG. 1 according to some embodiments of present inventive concepts.

FIG. 2 is a block diagram illustrating elements of a base station BS of FIG. 1. As shown, a base station BS may include a transceiver circuit 201 (also referred to as a transceiver or radio interface or a communication interface) configured to provide radio communications with a plurality of wireless terminals, a network interface circuit 205 (also referred to as a network interface) configured to provide communications with other base stations of the RAN (e.g., over the X2 interface), and a processor circuit 203 (also referred to as a processor) coupled to the transceiver circuit and the network interface circuit, and a memory circuit 207 (also referred to as memory) coupled to the processor circuit. The memory circuit 207 may include computer readable program code that when executed by the processor circuit 203 causes the processor circuit to perform operations according to embodiments disclosed herein. According to other embodiments, processor circuit 203 may be defined to include memory so that a memory circuit is not separately provided.

Figure 3:
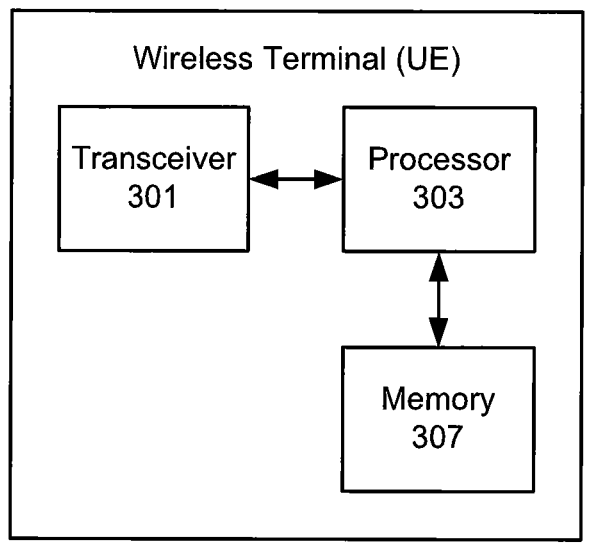
FIG. 3 is a block diagram illustrating a wireless terminal of FIG. 1 according to some embodiments of present inventive concepts.

FIG. 3 is a block diagram illustrating elements of a wireless terminal UE of FIG. 1. As shown, a wireless terminal UE may include a transceiver circuit 301 (also referred to as a transceiver) including a transmitter and a receiver configured to provide radio communications with a base station BS, a processor circuit 303 (also referred to as a processor) coupled to the transceiver circuit, and a memory circuit 307 (also referred to as memory) coupled to the processor circuit. The memory circuit 307 may include computer readable program code that when executed by the processor circuit 303 causes the processor circuit to perform operations according to embodiments disclosed herein. According to other embodiments, processor circuit 303 may be defined to include memory so that a memory circuit is not separately provided.

Figure 4:
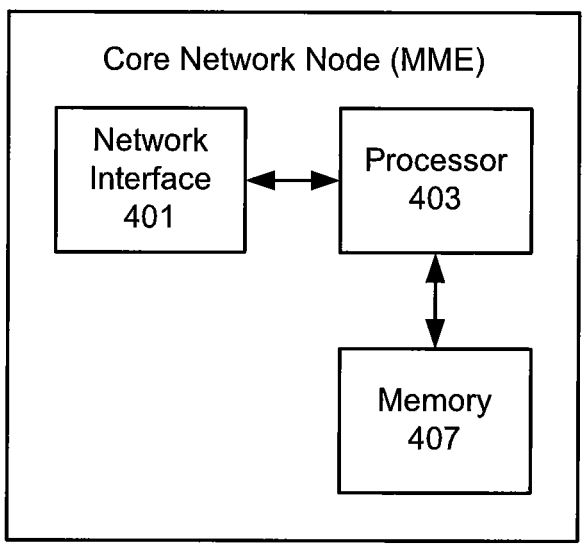
FIG. 4 is a block diagram illustrating a core network node according to some embodiments of present inventive concepts.

FIG. 4 is a block diagram illustrating elements of a core network node (e.g., an MME and/or an SGSN) of FIG. 1. As shown, a core network node may include a network interface circuit 401 (also referred to as a network interface or a communication interface) configured to provide communications with base stations of the RAN (e.g., over the S1 interface), a processor circuit 403 (also referred to as a processor) coupled to the network interface circuit, and a memory circuit 407 (also referred to as memory) coupled to the processor circuit. The memory circuit 407 may include computer readable program code that when executed by the processor circuit 403 causes the processor circuit to perform operations according to embodiments disclosed herein. According to other embodiments, processor circuit 403 may be defined to include memory so that a memory circuit is not separately provided.

In LTE, downlink PDSCH (Physical Downlink Shared Channel) assignments use resource elements spread over all OFDM symbols in a 1 ms downlink subframe. According to some embodiments disclosed herein, latency may be reduced by using PDSCH assignments covering a (consecutive) subset of symbols within a subframe. Such as a subset of symbols may be referred to as sub-subframe (SSF), and data assignments covering a SSF are illustrated herein as sPDSCH. To maintain backward compatibility and to be able to frequency multiplex legacy wireless terminal users, the existing OFDM modulation may be used, and the sub-subframe division may be done at the OFDM symbol level. As one example, the duration of a subframe may be 1 ms including 14 OFDM symbols, and the duration of a SSF may be seven OFDM symbols (i.e., 0.5 ms, for the case with a normal cyclic prefix).

By assigning sPDSCH resources within a sub-subframe (i.e., with shorter duration as compared to a full subframe), decoding latency may be reduced since the transmission ends earlier and take less time, even for roughly the same processing capability, assuming that the payload size is down scaled appropriately. This reduction in latency may further be used to reduce HARQ (Hybrid Automatic Repeat Request) RTT (Round Trip Time) since ACK/NACK (Acknowledge/Negative-Acknowledge) feedback can be provided earlier from a downlink transmission and UE side processing perspective. If the uplink enables timely transmission of ACK/NACK feedback and the network processing time related to retransmissions can be scaled with the same factor as the SSF as compared to the 1 ms sub-frame, then the HARQ RTT may be reduced with the same factor. For a 0.5 ms SSF, for example, the HARQ RTT may become 4 ms (instead of 8 ms). However, embodiments of inventive concepts described herein are not dependent on a reduction of the processing time.

An example of sub-subframe assignments for wireless terminals UE1, UE2, UE3, and UE4 of FIG. 1 over two subframes n and n+1 is illustrated in FIG. 5. It should be noted that other SSF lengths are possible, and that all SSFs are not required to have the same duration in terms of number(s) of OFDM symbols. In the example of FIG. 5, wireless terminal UE1 is assigned a full subframe (14 symbols less symbols used for Physical Downlink Control Channel or PDCCH) over a first frequency resource for downlink transmission in subframe n, and wireless terminal UE1 is assigned four 2 symbol sub-subframes over a second frequency resource for downlink transmissions in subframe n+1. Wireless terminal UE2 is assigned two 7 symbol sub-subframes (less symbols used for PDCCH) over the second frequency resource for downlink transmission in subframe n, and wireless terminal UE2 is assigned two 2 symbol sub-subframes over the second frequency resource for downlink transmissions in subframe n+1. Wireless terminal UE3 is assigned one 7 symbol sub-subframe (less symbols used for PDCCH) over a third frequency resource for downlink transmission in subframe n, and there is no downlink assignment for wireless terminal UE3 for sub-subframe n+1. Wireless terminal UE4 is assigned one 7 symbol sub-subframe over the third frequency resource for downlink transmission in subframe n, and wireless terminal UE4 is assigned three 4 symbol sub-subframes over the third frequency resource for downlink transmissions in subframe n+1. In addition, legacy control information and reference signals (such as legacy DCI PDCCH and CRS) may be transmitted, and PDSCH/sPDSCH is not mapped to such occupied resource elements.

Existing physical layer downlink control channels, Physical Downlink Control Channel (PDCCH) and EPDCCH (Enhanced PDCCH), may be transmitted once per 1 ms subframe. Furthermore,

- A PDCCH is distributed over the whole carrier bandwidth, but is time multiplexed with PDSCH over the first 1-4 symbols in the subframe.
- An EPDCCH is distributed over the whole 1 ms subframe, but is frequency multiplexed with PDSCH and multiplexed onto one or multiple PRB pairs for localized and distributed transmission respectively.
- PDCCH has common search space where all UEs may need to detect common cell specific control information.
- Depending whether a wireless terminal UE has been configured for ePDCCH or not, the wireless terminal UE processor 303 searches UE specific control information from wireless terminal UE search space of ePDCCH or PDCCH, respectively.
- The exact DownLink DL data allocation is given in downlink control information (DCI) format which may have different options depending on, for example, a configured transmission mode.
- The size of the PDCCH region can change dynamically on subframe basis, with the size of the PDCCH region being signaled on the PCFICH (Physical Control Format Indicator Channel) in the beginning of the 1 ms subframe.
- The frequency domain allocation of the EPDCCH may be semi-statically configured by means of higher layer signaling.

Current control channels carry control information, referred to as downlink control information (DCI). When a wireless terminal UE is configured with a certain transmission mode, the wireless terminal will (in each subframe when it is not in discontinuous reception DRX) attempt PDCCH decoding of a finite number of DCI formats transmitted on the PDCCH (or EPDCCH) for a number of candidate PDCCH resource allocations (referred to as a search space). The DCI format has a CRC (Cyclic Redundancy Check) which is scrambled by a wireless terminal UE identification (such as a C-RNTI), and when the CRC matches after descrambling, a PDCCH with a certain DCI format has been detected. There are also identifications that are shared by multiple terminals, such as the SI-RNTI which is used for transmission of system information.

Different DCI formats may be distinguished by different pay load sizes (i.e., number of bits in the DCI format). Hence, if we have multiple DCI formats of different sizes, a need for UE blind decoding may increase since each size requires a decoding attempt for each candidate PDCCH resource allocation.

There are currently a number of different DCI formats. See, 3GPP TS 36.212, V12.3.0 (2014-12) for DL resource assignments including format 1, 1A, 1B, 1C, 1D, 2, 2A, 2B, 2C and 2D.

Format 1: single codeword transmission:
- 1 bit to indicate resource allocation type (type 0 or type 1),
- $\lceil N_{RB}^{DL}/P \rceil$ bits to indicate the resource allocation (type 0 or type 1),
- 3 bits to indicate HARQ process number (4 bits for TDD),
- 3 bits to indicate new data indicator (NDI) and redundancy version (RV),
- 5 bits to indicate modulation and code scheme (MCS).

Format 1A, 1B, 1D:
- $\lceil \log_2(N_{RB}^{DL}(N_{RB}^{DL}+1)/2) \rceil$ bits to indicate the resource allocation (type 2),
- 3 bits to indicate HARQ process number (4 bits for TDD),
- 3 bits to indicate new data indicator (NDI) and redundancy version (RV),
- 5 bits to indicate modulation and code scheme (MCS).

Format 2, 2A, 2B, 2C, 2D: two codeword transmission:
- $\lceil N_{RB}^{DL}/P \rceil$ bits to indicate the resource allocation (type 0 or type 1),
- 3 bits to indicate HARQ process number (4 bits for TDD),
- 2×3 bits to indicate new data indicator (NDI) and RV,
- 2×5 bits to indicate modulation and code scheme (MCS).

Here, P is the resource block group size which depends on the system bandwidth and $\lceil N_{RB}^{DL} \rceil$ is the number of resource blocks in the downlink.

As shown above, there are three different resource allocation types (Type 0, Type 1, and Type 2). For example, for Type 0, the system bandwidth is divided into resource block groups (RBGs) which consist of P PRB pairs, where P=1, 2, 3, 4 depending on total bandwidth. Then, there is one bitmap indicating whether something is scheduled in an RBG, and then a bitmap per RBG. The principle is same/similar for Type 1 and Type 2, and resources are allocated in frequency always assuming 1 ms length subframe.

The Downlink Control Information (DCI) for a downlink scheduling assignment may thus include information on downlink data resource allocation in the frequency domain (the resource allocation or frequency resource), modulation and coding scheme (MCS), and HARQ process information. In case of carrier aggregation, information related to which carrier the PDSCH is transmitted on may be included as well.

There are also DCI formats for UL grants, DCI format 0, and DCI format 4 as well as for power control commands and DCI formats 3 and 3A.

If control channels are only transmitted once per 1 ms subframe as shown in FIG. 5 and/or if control channels and DCIs are designed for PDSCH assignments with durations equal to the duration of the whole subframe, it may be difficult to further reduce latency. Moreover, existing control channels (PDCCH and EPDCCH) may not be suitable for efficient sharing of resources through frequency multiplexing between (legacy) UEs using 1 ms subframes and UEs using shorter sub-subframes within the same subframe. For EPDCCH, the entire 1 ms EPDCCH may need to be received in order to get the scheduling indication. It may thus be difficult to use EPDCCH to schedule shorter sub-subframes because the latency benefit may be lost when the wireless terminal UE waits until the end of the subframe to decode the control information and thus the downlink data. For PDCCH, the PDCCH could in theory be used and transmitted more often (i.e., more frequently than 1 ms), but because PDCCH is spread over the entire bandwidth, this may be inefficient, resulting in unnecessary overhead.

According to some embodiments of inventive concepts, control information (such as PDSCH sub-subframe assignments) may be signaled more frequently than once per subframe (e.g., more frequently than once per 1 ms), with reduced control information payloads relative to existing DCI formats, and only when needed.

For example, downlink control information may be partitioned into fast DCI (which can vary between different sub-subframes) and slow DCI (which may change, at most, once per subframe). The fast DCI may be conveyed to the wireless terminal UE using an sPDCCH transmission(s). The wireless terminal UE may monitor different sPDCCH candidate resources and attempt to decode an sPDCCH transmission intended for itself. If successful, the fast DCI from the sPDCCH (together with the slow DCI) may be used to determine an sPDSCH DL assignment or (sPUSCH UL grant) for the UE. Different embodiments may cover configuring sPDCCH resources, partitioning between slow and fast DCI, and/or conveying the DCI to the terminal. In LTE, uplink PUSCH scheduling grants may use resource elements spread over all OFDM symbols in a 1 ms uplink subframe. According to some embodiments disclosed herein, latency may be reduced by using PUSCH grants covering a (consecutive) subset of symbols within a subframe. Such a subset of symbols may be referred to as a sub-subframe, and scheduling grants covering a sub-subframe may be transmitted on a physical channel referred to as sPUSCH.

According to some embodiments, use of fast/slow control information (e.g., DCI) may enable scheduling decisions within a subframe, thereby reducing frame alignment delay and/or contributing to reduction of HARQ RTT as compared to using PDCCH alone. In addition, dynamic sharing of resources between (legacy) terminals using 1 ms subframes and shorter sub-subframes may be enabled. Moreover, DCI overhead may be reduced as compared to re-using the PDCCH but transmitting it more often.

The scheduler in the base station BS (also referred to as an eNodeB) may allocate downlink PDSCH resources to terminals in the cell served by the base station, and the base station BS decides whether a wireless terminal is to be given an assignment (e.g., a downlink assignment) with 1 ms subframe duration or an assignment with one or multiple sub-subframes with duration(s) shorter than a duration of the subframe. From a wireless terminal perspective, these assignments may change dynamically from subframe to subframe and may allow improvement/optimization of the end-user experience. For example, a 1 ms subframe may be better from a throughput perspective, whereas a short sub-subframe(s) may be better from a latency perspective. For the commonly used TCP (Transmission Control Protocol) protocol, for example, user throughput may typically be latency limited during slow-start and may later become throughput limited.

According to some embodiments, resources may be dynamically roughly divided in the frequency domain between legacy PDSCH subframe assignments and sub-subframe sPDSCH assignments once every subframe and/or once every ms. In such cases, one scheduler may schedule legacy 1 ms subframes every subframe and/or ms, whereas a sub-subframe scheduler (operating at higher frequency) may schedule sub-subframes within the resources roughly assigned for such transmissions. Downlink assignments for 1 ms subframes may be conveyed using PDCCH whereas assignments for the sub-subframes may be conveyed using the sPDCCH.

If a latency sensitive packet arrives after the rough division, it may be possible for the sub-subframe scheduler to override the previous division and schedule a sub-subframe in resources previously assigned as 1 ms subframe. It may happen that the terminal receiving the legacy subframe assignment may not be able to correctly decode the PDSCH.

The slow control information (e.g., slow DCI) may be changed at most once per subframe and/or once per ms and may be common for all sub-subframes in a given subframe. The slow control information (e.g., DCI) may either be intended for a specific wireless terminals UE or common to a group of several wireless terminals UEs. The slow control information (e.g., DCI) may be:

Semi-statically configured by higher layer RRC or MAC signaling and hence changed relatively infrequently (e.g., slow control information may remain static over a plurality of subframes);

Dynamically (re-)configured using a (E)PDCCH (or even a sPDCCH) transmitted in every subframe; or Static.

In the case that the slow control information (e.g., slow DCI) is transmitted on a (E)PDCCH and is intended for several wireless terminals UEs, the slow control information (e.g., slow DCI) may be scrambled using a group RNTI (Radio Network Temporary Identifier) common to all of the recipients of the group of wireless terminals. A single wireless terminal UE can belong to more than one group, and multiple group RNTIs may thus be assigned to a single wireless terminal UE. The fast control information (e.g., fast DCI) may be intended for a specific UE, and the fast control information (e.g., fast DCI) may thus be scrambled using a wireless terminal UE specific identification, such as the C-RNTI (Cell Radio-Network Temporary Identifier).

A significant payload reduction in the sPDCCH fast control information (e.g., fast DCI) may be achieved with respect to the frequency domain resource allocation. For example—

According to some embodiments, the fast control information (e.g., fast DCI) on the sPDCCH may not include any sPDSCH frequency domain resource allocation information at all. In such embodiments, the wireless terminal UE may determine frequency domain resource allocation information from the slow control information (e.g., slow DCI), which may be provided using higher layer configuration and/or PDCCH resource allocation.

According to some other embodiments, the fast control information (e.g., fast DCI) on the sPDCCH may include a short field indicating one out of a few different frequency domain resource allocations, predefined and/or conveyed by the slow control information (e.g., slow DCI) including configuration by higher layers and/or via PDCCH.

Another form of payload reduction may be to use a shorter wireless terminal UE specific identification for the sPDCCH with fewer bits than the 16 bits used for the C-RNTI.

According to some embodiments, further payload reduction may be achieved by indicating more parameters common to all assigned sub-subframes, such as, MCS (Modulation and Coding Scheme) and MIMO (Multiple Input Multiple Output) related precoding information. This may be useful when all sub-subframes are assigned to a single wireless terminals UE. Note that the control information (e.g., DCI) can carry both DL scheduling assignments as well as UL grants. Even though the present disclosure has a DL focus, the UL assignments may be covered as well in some embodiments.

According to some embodiments, there may be two ways to configure the sPDCCH resource allocations: Semi-statically configured by higher layers; and/or dynamically varying from subframe to subframe.

According to some embodiments, information regarding configuration of sPDCCH resource allocations may be conveyed in the control information (e.g., DCI) of a PDCCH. Such a PDCCH could either be intended for a single wireless terminal UE (CRC scrambling with C-RNTI), or to a group of wireless terminals UEs (and have CRC scrambling with an RNTI that is monitored by several wireless terminals). According to some other embodiments, a signal similar to PCFICH may be defined that once every subframe would indicate sPDCCH resources, for example, selecting one out several allocations, each allocation being configured by higher layer signaling. In both of these embodiments, the starting symbol of the first position in the time domain could also be given as for EPDCCH and depend on the length of the PDCCH region.

For embodiments with dynamic variations, slow control information (e.g., DCI) once every subframe may configure the sPDCCH candidate resource(s) in both time and frequency. The physical channel could be either a (E)PDCCH or an sPDCCH.

For each of these embodiments, the sPDCCH may use any number of OFDM symbols, and may be multiplexed in time or frequency with (s)PDSCH. In FIG. 6, the sPDCCH is transmitted with a contiguous allocation at the band edge in the frequency domain, but it can also be (arbitrarily) distributed in the frequency domain with non-contiguous allocations, similar to EPDCCH. In FIGS. 6-10, the sPDCCH is shown being transmitted only in the first symbol of each respective sub-subframe, but the sPDCCH might also be transmitted in multiple symbols of a respective sub-subframe.

The wireless terminal UE monitors sPDCCH resources and attempts decoding, for example, using the relevant (UE specific) RNTI for CRC descrambling. If the base station BS (eNodeB) has transmitted control information (e.g., DCI) on an sPDCCH for a particular wireless terminal UE, the wireless terminal UE may detect the control information through successful decoding (including descrambling based on the wireless terminal specific identification, e.g., RNTI). If the base station BS (eNodeB) is using the resources for PDSCH transmissions (e.g., for legacy 1 ms PDSCH assignments), decoding may with sufficiently high probability fail and the terminal will detect that there was no control information (e.g., DCI) on a sPDCCH transmitted to it.

From a wireless terminal UE perspective according to some embodiments, each wireless terminal UE is assigned a group identification (e.g., RNTI) that is shared with a group of wireless terminals and an individual identification (e.g., C-RNTI) that is specifically assigned to that wireless terminal. The wireless terminal UE monitors the PDCCH transmission and attempts to unscramble downlink control information using the assigned group RNTI. If a match is found, the corresponding (slow) control information (e.g., slow DCI) may determine the frequency resource(s) used for any sPDSCH transmissions (for the group of wireless terminals) in the subframe. Similarly, the UE may monitor the possible sPDCCH candidate resources and try to unscramble them using its individual identification (e.g., C-RNTI). If a match is found, the fast control information (e.g., fast DCI) from the sPDCCH together with the frequency allocation from the slow control information (e.g., slow DCI) in the PDCCH determines the resources used for downlink data transmission over sPDSCH, as well as HARQ information and MCS information.

FIGS. 6-10 illustrate different embodiments of allocating frequency/time resources for PDCCH, sPDCCH, and/or sPDSCH.

According to embodiments illustrated in FIG. 6, frequency and/or time resources used by a fast control channel (e.g., sPDCCH) for transmission of fast control information (e.g., fast DCI), such as, wireless terminal UE assignments of sPDSCH sub-subframes and time resources thereof, may be configured using higher layer signaling from the base station (e.g., MAC and/or RRC signaling when the wireless terminal attaches to the base station). Accordingly, frequency and/or time resources used by sPDCCH may remain relatively static over a plurality of subframes. Frequency resources used by the sPDSCH downlink sub-subframes may be considered slow control information (e.g., slow DCI) and may be signaled once per ms using PDCCH to a group of UEs (sharing a same RNTI). While time resources for sPDCCH may be configured using higher layer signaling according to some embodiments, according to other embodiments time resources for sPDCCH may be configured each subframe using a slow control information transmitted via PDCCH.

In FIG. 6, wireless terminals UE1, UE2, and UE3 may belong to a same group sharing a group identification (e.g., a group RNTI), and each wireless terminal UE1, UE2, and UE3 may have an individual identification (e.g., an individual C-RNTI). At the beginning of the $1^{st}$ subframe, slow control information (e.g., slow DCI) may be scrambled with the group identification and transmitted over the slow control channel (e.g., PDCCH). More particularly, the slow control information may include a frequency resource (e.g., the $1^{st}$ frequency resource) allocated for sPDSCH sub-subframes used for transmissions to wireless terminals UE1, UE2, and UE3 during the first subframe. Accordingly, the frequency resource used for sPDSCH sub-subframes assigned to these wireless terminals may not change during a subframe. The group of wireless terminals sharing the group identification can thus unscramble the slow control information (e.g., the frequency resource) for the subframe using the group identification.

As noted above, the time/frequency resources for wireless terminals UE1, UE2, and UE3 to receive fast control information using a fast control channel (e.g., sPDCCH) may be configured by higher layer signaling. At the time for each transmission of fast control information using a fast control channel (e.g., sPDCCH), each wireless terminal UE1, UE2, and UE3 of the group may thus attempt to descramble the fast control channel (e.g., sPDCCH) using the respective individual identification (e.g., C-RNTI). The fast control information may define a time resource for a sub-subframe assigned to the particular wireless terminal. The fast control channel may also include MCS (modulation and coding scheme) information, MIMO (multiple input multiple output) precoding information, HARQ ACK/NACK information, etc. for the assigned sub-subframe. According to additional embodiments of FIG. 6, the slow control information may include a plurality of frequency resources available for sub-subframe assignments, and the fast control information for each sub-subframe may include an identification of one of the available frequency resources.

In the example of FIG. 6, the fast control channel sPDCCH-1 may be used to transmit fast control information scrambled with the individual identification for wireless terminal UE1 with the fast control information defining a time resource for the first sub-subframe sPDSCH-1 assigned to wireless terminal UE1. Wireless terminal UE1 may thus descramble the fast control information using its individual identification, and receive downlink data over the assigned sub-subframe sPDSCH-1 (defined by a frequency resource received via PDCCH and a time resource received via sPDCCH-1). Because wireless terminals UE2 and UE3 are unable to descramble the control information scrambled with the individual identification of wireless terminal UE1, wireless terminals UE2 and UE3 will not attempt to receive downlink data over sub-subframe sPDSCH-1.

Similarly, the fast control channel sPDCCH-2 may be used to transmit fast control information scrambled with the individual identification for wireless terminal UE2, with the fast control information defining a time resource for the second sub-subframe sPDSCH-2 assigned to wireless terminal UE2. Wireless terminal UE2 may thus descramble the fast control information using its individual identification, and then receive downlink data over the assigned sub-subframe sPDSCH-2 (defined by a frequency resource received via PDCCH and a time resource received via sPDCCH-2). Because wireless terminals UE1 and UE3 are unable to descramble the control information scrambled with the individual identification of wireless terminal UE2, wireless terminals UE1 and UE3 will not attempt to receive downlink data over sub-subframe sPDSCH-2.

The fast control channel sPDCCH-3 may be used to transmit fast control information scrambled with the individual identification for wireless terminal UE3, with the fast control information defining a time resource for the third sub-subframe sPDSCH-3 assigned to wireless terminal UE3. Wireless terminal UE3 may thus descramble the fast control information using its individual identification, and then receive downlink data over the assigned sub-subframe sPDSCH-3 (defined by a frequency resource received via. PDCCH and a time resource received via sPDCCH-3). Because wireless terminals UE1 and UE2 are unable to descramble the control information scrambled with the individual identification of wireless terminal UE3, wireless terminals UE1 and UE2 will not attempt to receive downlink data over sub-subframe sPDSCH-3.

At the beginning of the $2^{nd}$ subframe, slow control information (e.g., slow DCI) may be scrambled with the group identification and transmitted over the slow control channel (e.g., PDCCH-2). More particularly, the slow control information may include a frequency resource (e.g., the $2^{nd}$ frequency resource) allocated for sPDSCH sub-subframes used for transmissions to wireless terminals UE1, UE2, and UE3 during the second subframe. Different frequency resources may thus be allocated during different subframes as shown in FIG. 6.

The fast control channel sPDCCH-4 may be used to transmit fast control information scrambled with the individual identification for wireless terminal UE1 with the fast control information defining a time resource for the sub-subframe sPDSCH-4 assigned to wireless terminal UE1 in the second subframe. Wireless terminal UE1 may thus descramble the fast control information using its individual identification, and then receive downlink data over the assigned sub-subframe sPDSCH-4 (defined by a frequency resource received via PDCCH-1 and a time resource received via sPDCCH-4). Because wireless terminals UE2 and UE3 are unable to descramble the control information scrambled with the individual identification of wireless terminal UE1, wireless terminals UE2 and UE3 will not attempt to receive downlink data over sub-subframe sPDSCH-4.

As further shown in FIG. 6, numbers and relative locations (in frequency and time) of fast control channel assignments for the first subframe (sPDCCH-1, sPDCCH-2, and sPDCCH-3) and the second subframe (sPDCCH-4, sPDCCH-5, and sPDCCH-6) may be the same, but not all such assignments are required to be used. As shown in the second subframe of FIG. 6, for example, a full duration of the second subframe is assigned by fast control channel sPDCCH-4 for sub-subframe sPDSCH-4. Accordingly, and fast control channel assignments sPDCCH-5 and sPDCCH-6 may thus be unused with respect to wireless terminals sharing the group identification discussed above. Moreover, a frequency resource for the group of wireless terminals UE1, UE2, and UE3 may be unused for some or all of a subframe. For example, sub-subframe sPDSCH-4 may occupy only a first third of the second subframe (after completion of slow control channel PDCCH-2) with a remainder of the second frequency resource being unused in the second subframe.

According to embodiments of FIG. 7, time and frequency resources used by fast control channels sPDCCH for a group of wireless terminals sharing a group identification and frequency resources used by sub-subframes sPDSCH for the group of wireless terminals sharing the group identification may be configured at the wireless terminals using higher layer signaling from the base station. In such embodiments, frequency resources used by sub-subframes sPDSCH for the group of wireless terminals may remain relatively static over a plurality of subframes, and the frequency and/or time resources used by fast control channels sPDCCH may remain relatively static from one subframe to the next. According to some other embodiments, a plurality of frequency resources for sub-subframes sPDSCH may be configured at the wireless terminal using higher layer signaling, and fast control information for a particular sub-subframe sPDSCH may identify one of the plurality of frequency resources for that sub-subframe sPDSCH.

Otherwise, base station and wireless terminal operations relating to FIG. 7 may be similar to those discussed above with respect to FIG. 6. In general, a fast control channel sPDCCH may be used to transmit fast control information scrambled with an individual identification for a respective wireless terminal with the fast control information defining a time resource for a sub-subframe sPDSCH assigned to the wireless terminal.

According to embodiments of FIG. 8, the frequency resources used by fast control channels sPDCCH and sub-subframes sPDSCH may be transmitted as slow control information and signaled once per ms (e.g., once per subframe) using slow control channel PDCCH to a group of wireless terminals sharing a group identification. As discussed above with respect to FIG. 6, frequency resources used for sub-subframes sPDSCH may thus change from one subframe to the next. In addition, frequency resources used for fast control channels sPDCCH may change from one subframe to the next. Otherwise, wireless terminals and base stations operations relating to FIG. 8 may be similar to those discussed above with respect to FIGS. 6 and/or 7.

According to embodiments of FIG. 9, a common frequency resource may be used by fast control channels sPDCCH and sub-subframes sPDSCH, and this common frequency resource may be configured at the wireless terminals using higher layer signaling from the base station. As shown in FIG. 9, the frequency resource may thus remain relatively static from one subframe to the next. As before, wireless terminals UE1, UE2, UE3, and UE4 may be assigned a same group identification (e.g., a group RNTI), but different individual identifications (e.g., individual C-RNTI's).

In embodiments of FIG. 9, all wireless terminals of the group may monitor the slow control channel PDCCH and each fast control channel sPDCCH of each subframe using their respective individual identifications to determine if a sub-subframe is being assigned. For example, a time resource for a first sub-subframe sPDSCH-1 may be transmitted as fast control information using slow control channel PDCCH-1 and scrambled using the individual identification for wireless terminal UE1. Wireless terminal UE 1 may thus receive this fast control information, and responsive thereto, wireless terminal UE1 can proceed to receive downlink data in sub-subframe sPDSCH-1.

A time resource for a second sub-subframe sPDSCH-2 may be transmitted as fast control information using fast control channel sPDCCH-2 and scrambled using the individual identification for wireless terminal UE2. Wireless terminal UE2 may thus receive this fast control information, and responsive thereto, wireless terminal UE2 can proceed to receive downlink data in sub-subframe sPDSCH-2.

A time resource for a third sub-subframe sPDSCH-3 may be transmitted as a fast control information using fast control channel sPDCCH-3 and scrambled using the individual identification for wireless terminal UE3. Wireless terminal UE3 may thus receive this fast control information, and responsive thereto, wireless terminal UE3 can proceed to receive downlink data in sub-subframe sPDSCH-3.

A time resource for a fourth sub-subframe sPDSCH-4 may be transmitted as a fast control information using slow control channel PDCCH-2 and scrambled using the individual identification for wireless terminal UE2. Wireless terminal UE 2 may thus receive this control information, and responsive thereto, wireless terminal UE2 can proceed to receive downlink data in sub-subframe sPDSCH-4.

A time resource for a fifth sub-subframe sPDSCH-5 may be transmitted as a fast control information using fast control channel sPDCCH-5 and scrambled using the individual identification for wireless terminal UE3. Wireless terminal UE3 may thus receive this fast control information, and responsive thereto, wireless terminal UE3 can proceed to receive downlink data in sub-subframe sPDSCH-5.

A time resource for a sixth sub-subframe sPDSCH-6 may be transmitted as a fast control information using fast control channel sPDCCH-6 and scrambled using the individual identification for wireless terminal UE4. Wireless terminal UE4 may thus receive this fast control information, and responsive thereto, wireless terminal UE4 can proceed to receive downlink data in sub-subframe sPDSCH-6.

According to embodiments of FIG. 10, a common frequency resource used by fast control channels sPDCCH and sub-subframes sPDSCH may be provided as slow control information and signaled once per ms (e.g., once per subframe) using the slow control channel PDCCH to a group of wireless terminals UE1, UE2, UE3, and UE4 sharing a group identification. As further shown in FIG. 10, time resources used by fast control channels sPDCCH may also be provided as slow control information and signaled once per ms (e.g., once per subframe) using slow control channel PDCCH to the group of wireless terminals. Accordingly, frequency resources for sub-subframes sPDSCH and fast control channels sPDCCH may change from one subframe to the next, and numbers/timings of fast control channels sPDCCH may change from one subframe to the next.

According to embodiments discussed above, a group of wireless terminals UEs may be provided with information regarding time and frequency resources for fast control information transmitted via fast control channels sPDCCH, once per subframe via PDCCH, or via higher layer signaling from the base station, and time resources for sub-subframes sPDSCH assigned to particular wireless terminals of the group may be received as fast control information via fast control channels sPDCCH. A wireless terminal may thus combine partial control information received via a fast control channel sPDCCH with less frequently signaled control information in a subframe structure to receive sub-subframe assignments.

Figure 11A:
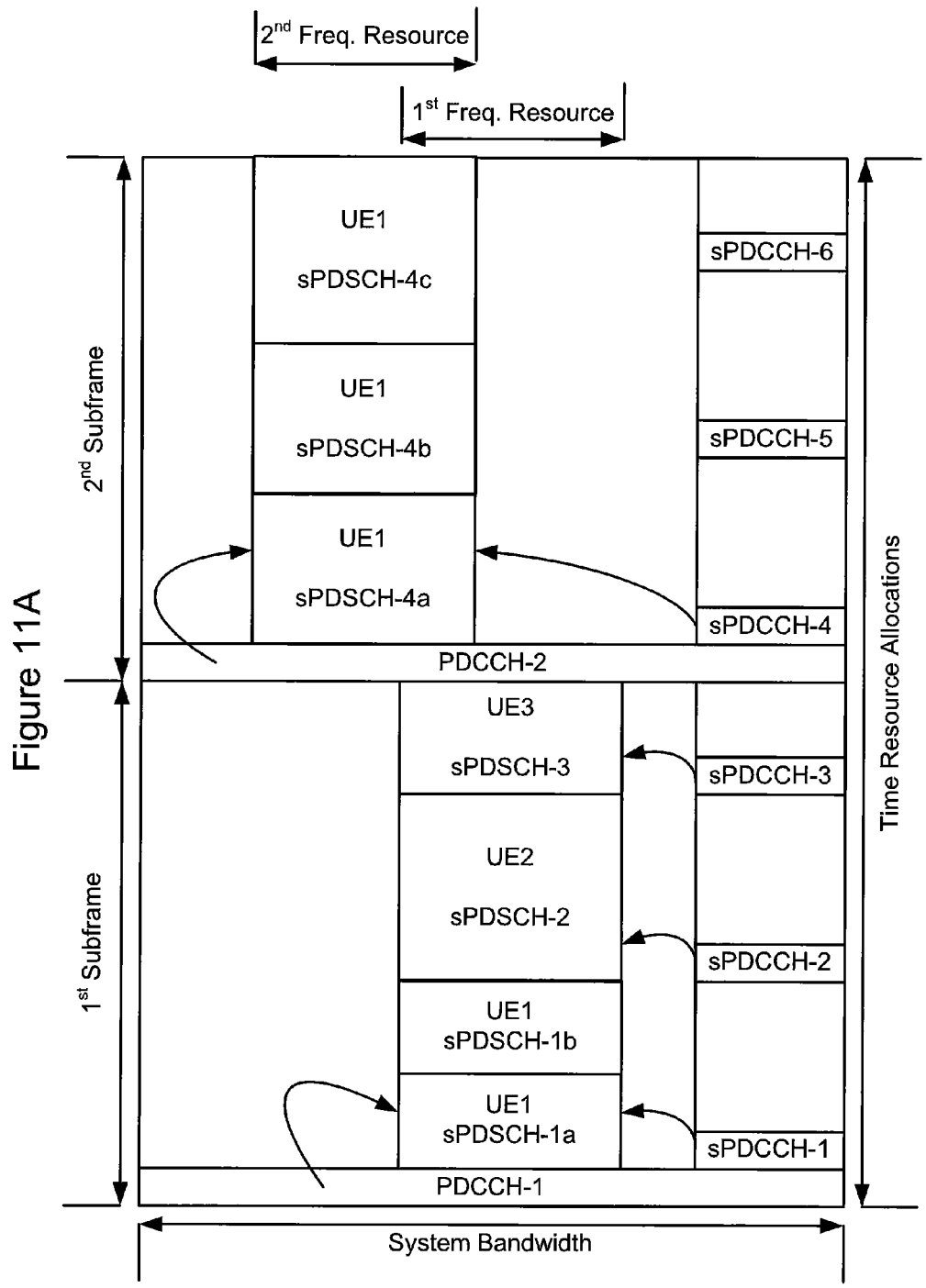

While not shown in FIGS. 6-10, a fast control channel sPDCCH may be used to assign multiple sub-subframes to the same wireless terminal. As shown for example in FIG. 11A, corresponding to FIG. 6, fast control channel sPDCCH-1 may be used to transmit fast control information assigning two consecutive sub-subframes for downlink transmission of data to wireless terminal UE1 in the first subframe, and fast control channel sPDCCH-4 may be used to transmit fast control information assigning three consecutive sub-subframes for downlink transmission of data to wireless terminal UE1 in the second subframe. Otherwise, FIG. 11A is the same as FIG. 6, and the same/similar concepts may apply with respect to embodiments of FIGS. 7 and 8. Similarly in FIG. 11B, corresponding to FIG. 9, fast control channel sPDCCH-2 may be used to transmit fast control information assigning two consecutive sub-subframes for downlink transmission of data to wireless terminal UE2. Otherwise, FIG. 11B is the same as FIG. 9, and the same/similar concepts may apply with respect to embodiments of FIG. 10.

In embodiments illustrated in FIGS. 6, 7, 8, 9, 10, 11A, and 11B, sPDCCH is shown with contiguous frequency resource allocations, but according to other embodiments, the frequency resource allocations of sPDCCH in FIGS. 6, 7, 8, 9, 10, 11A, and 11B may be distributed in the frequency domain with non-contiguous allocations. Similarly, in embodiments illustrated in FIGS. 6, 7, 8, 9, 10, 11A, and 11B, sPDSCH is shown with contiguous frequency resource allocations, but according to other embodiments, the frequency resource allocations of sPDSCH in FIGS. 6, 7, 8, 9, 10, 11A, and 11B may be distributed in the frequency domain with non-contiguous allocations.

Figure 12:
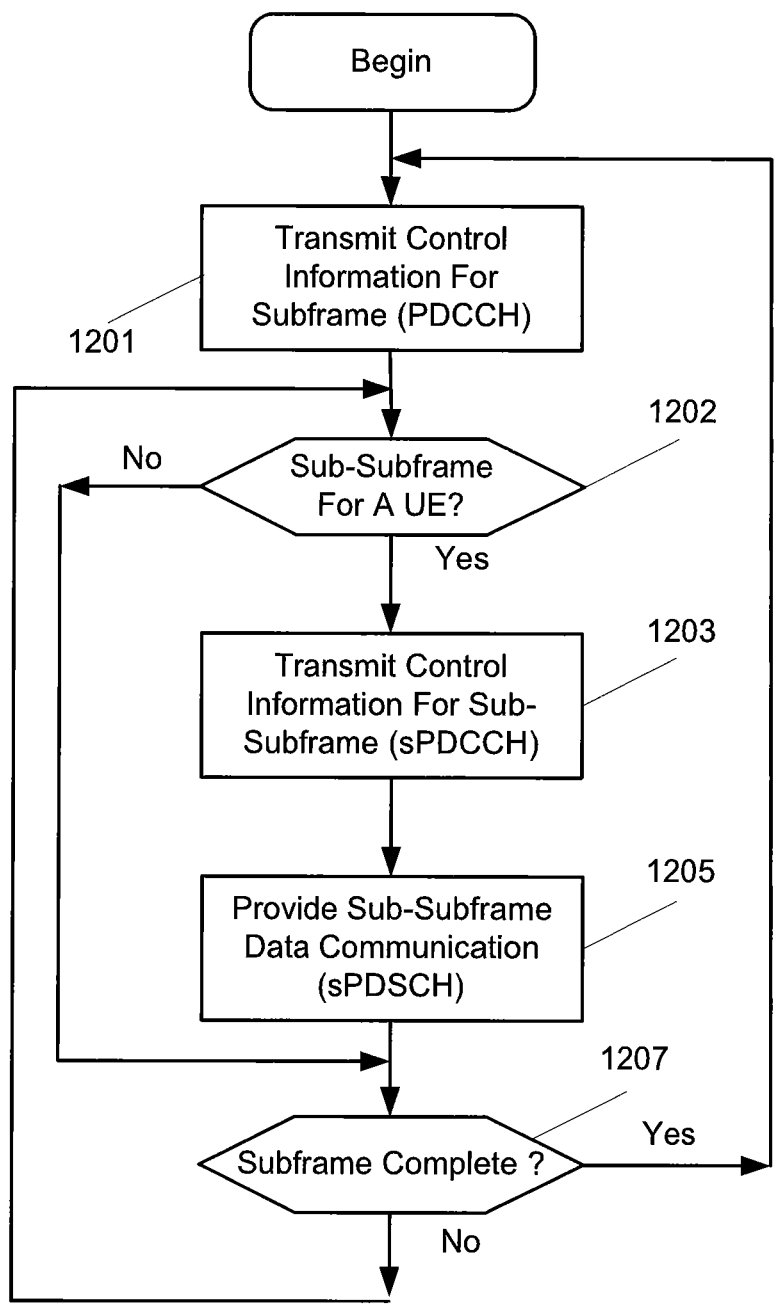
FIG. 12 is a flow chart illustrating network node operations according to some embodiments of present inventive concepts.

FIG. 12 is a flow chart illustrating operations of base station BS-1 in communication with wireless terminals UE1, UE2, and UE3 according to some embodiments of present inventive concepts, and operations thereof will be discussed by way of example with respect to the time-frequency diagram of FIG. 6. In general, first control information (e.g., PDCCH-1 for a first subframe and PDCCH-2 for a second subframe) may be transmitted for a respective subframe defining a frequency resource/resources available for data communication. In addition, second control information (e.g., sPDCCH-1, sPDCCH-2, and sPDCCH-3 for the first subframe) may be provided to define a time resource for a respective sub-subframe of the subframe. Accordingly, data communication may be provided during a sub-subframe (e.g., sPDSCH-1) defined by a frequency resource of first control information (e.g., PDCCH-1) and a time resource of second control information (e.g., sPDCCH-1).

At block 1201, processor 201 may transmit first control information PDCCH-1 for a first subframe through transceiver 201 to wireless terminals UE1, UE2, and UE3, with first control information PDCCH-1 defining a frequency resource available for data communication with the wireless terminals UE1, UE2, and UE3 over the first subframe. Control information PDCCH-2 may define a frequency resource available for data communication with a plurality of wireless terminals (e.g., wireless terminals UE1, UE2, and UE3).

After transmitting first control information PDCCH-1 for the first subframe, processor 203 may determine at block 1202 if a sub-subframe is scheduled for a wireless terminal. Responsive to scheduling a sub-subframe sPDSCH-1 of the first subframe for wireless terminal UE1 at block 1202, processor 203 transmits second control information sPDCCH-1 through transceiver 201 to wireless terminal UE1, with the second control information sPDCCH-1 defining a time resource for sub-subframe sPDSCH-1 of the first subframe for wireless terminal UE1. At block 1205, processor 203 may provide communication of data through transceiver 201 with wireless terminal UE1 during sub-subframe sPDSCH-1 of the first subframe defined by the frequency resource of first control information PDCCH-1 and the time resource of second control information sPDCCH-1.

Operations of blocks 1202, 1203, 1205, and 1207 may be repeated by processor 203 with respect to wireless terminals UE1, UE2, and UE3 sharing the frequency resource for each sub-subframe scheduled for one of wireless terminals UE1, UE2, and UE3 during the first subframe until the first subframe is complete at block 1207. In the example of FIG. 6, only one sub-subframe sPDSCH-1 is scheduled for UE1 during the first subframe so that only one iteration of blocks 1202, 1203, 1205, and 1207 is performed for wireless terminal UE1 for the first subframe.

Processor 203 may also perform similar operations with respect to wireless terminals UE2 and UE3 during the first subframe as shown in FIG. 6. In addition, first control information PDCCH-1 may assign other frequency resources to other wireless terminals not shown in FIG. 6.

Responsive to scheduling sub-subframe sPDSCH-2 of the first subframe for wireless terminal UE2 at block 1202, processor 203 transmits control information sPDCCH-2 through transceiver 201 to wireless terminal UE2 at block 1203, with control information sPDCCH-2 defining a time resource for sub-subframe sPDSCH-2 of the first subframe. At block 1205, processor 203 provides communication of data through transceiver 201 with wireless terminal UE2 during sub-subframe sPDSCH-2 of the first subframe defined by the frequency resource of control information PDCCH-1 and the time resource of control information sPDCCH-2.

Responsive to scheduling sub-subframe sPDSCH-3 of the first subframe for wireless terminal UE3 at block 1202, processor 203 transmits control information sPDCCH-3 through transceiver 201 to wireless terminal UE3 at block 1203, with control information sPDCCH-3 defining a time resource for sub-subframe sPDSCH-3 of the first subframe. At block 1205, processor 203 provides communication of data through transceiver 201 with wireless terminal UE3 during sub-subframe sPDSCH-3 of the first subframe defined by the frequency resource of control information PDCCH-1 and the time resource of control information sPDCCH-3.

Upon completion of the first subframe at block 1207, processor 203 may proceed with the second subframe of FIG. 6. At block 1201, processor 203 may transmit control information PDCCH-2 to wireless terminal UE1, with control information PDCCH-2 defining a second frequency resource available for data communication with wireless terminal UE1 over the second subframe. As discussed above with respect to control information PDCCH-1, control information PDCCH-2 may define a frequency resource available for data communication with a plurality of wireless terminals.

Responsive to scheduling sub-subframe sPDSCH-4 of the second subframe for wireless terminal UE1 at block 1202, processor may transmit control information sPDCCH-4 through transceiver 201 to wireless terminal UE1 at block 1203, with control information sPDCCH-4 defining a time resource for sub-subframe sPDSCH-4 of the second subframe. At block 1205, processor 203 may provide communication of data through transceiver 201 with wireless terminal UE1 using sub-subframe sPDSCH-4 of the second subframe defined by the frequency resource of control information sPDCCH-2 and the time resource of control information sPDCCH-4.

Operations of FIG. 12 may be repeated for any number of subframes, for any number of frequency resources per subframe, for any number of sub-subframes per subframe, for any number of sub-subframes per frequency resource, and/or for any number of wireless terminals.

Figure 13:
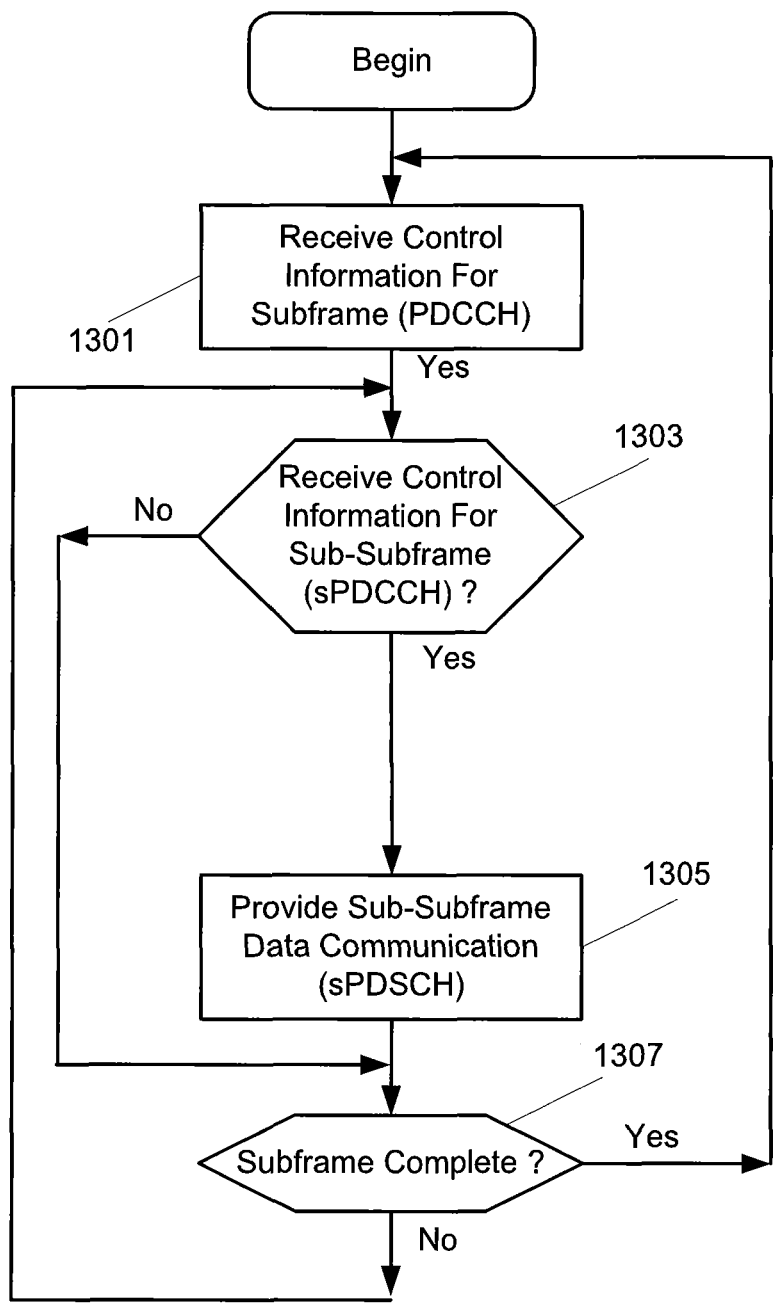
FIG. 13 is a flow chart illustrating wireless terminal operations according to some embodiments of present inventive concepts.

FIG. 13 is a flow chart illustrating operations of wireless terminal UE1 in communication with base station BS-1 according to some embodiments of present inventive concepts, and operations thereof will be discussed by way of example with respect to the time-frequency diagram of FIG. 6. In general, first control information (e.g., PDCCH-1 for a first subframe and PDCCH-2 for a second subframe) may be received for a respective subframe defining a frequency resource/resources available for data communication. In addition, second control information (e.g., sPDCCH-1 for the first subframe) may be provided to define a time resource for a respective sub-subframe of the subframe. Accordingly, data communication may be provided during a sub-subframe (e.g., sPDSCH-1) defined by a frequency resource of first control information (e.g., PDCCH-1) and a time resource of second control information (e.g., sPDCCH-1).

At block 1301, processor 303 may receive control information PDCCH-1 from base station BS-1, with control information PDCCH-1 defining a frequency resource available for data communication between base station BS-1 and wireless terminal UE1 over the first subframe. For each sub-subframe of the first subframe scheduled for wireless terminal UE1, processor 303 may receive control information defining a time resource for a sub-subframe of the subframe at operation 1303. For example, processor 303 may receive control information sPDCCH-1 through transceiver 301 from base station BS-1, with control information sPDCCH-1 defining a time resource for sub-subframe sPDSCH-1 of the first subframe. At block 1303, processor 303 listens (through transceiver 301) for additional control information on possible sPDCCH channels. If processor 303 is able to decode and descramble such sPDCCH control information at operation 1303 using an RNTI for the wireless terminal (e.g., sPDCCH-1), the sPDCCH control information is received by processor 303, and the sPDCCH control information is used to schedule an sPDSCH communication. If processor is unable to decode/descramble a particular block of sPDCCH control information at block 1303 (e.g., sPDCCH-2 or sPDCCH-3), processor does not receive that control information and the corresponding data communication is not scheduled.

At block 1305, processor 303 may provide communication of data through transceiver 301 with base station BS-1 during sub-subframe sPDSCH-1 of the first subframe defined by the frequency resource of control information PDCCH-1 and the time resource of control information sPDCCH-1.

Operations of blocks 1303, 1304, 1305, and 1307 may be repeated by processor 303 for each sub-subframe scheduled for wireless terminal UE1 until the first subframe is complete at block 1307. In the example, of FIG. 6, only one sub-subframe is scheduled for wireless terminal UE1 during the first sub-subframe.

Upon completion of the first subframe at block 1307, processor 303 may proceed with the second subframe of FIG. 6. At block 1301, processor 303 may receive control information PDCCH-2 from base station BS-1, with control information PDCCH-2 defining a frequency resource available for data communication between base station BS-1 and wireless terminal UE1 over the second subframe. For each sub-subframe of the second subframe scheduled for wireless terminal UE1, processor 303 may receive control information defining a time resource for a sub-subframe of the second subframe. For example, processor 303 may receive control information sPDCCH-4 through transceiver 301 from base station BS-1, with control information sPDCCH-4 defining a time resource for sub-subframe sPDSCH-4 of the second subframe. At block 1305, processor 303 may provide communication of data through transceiver 301 with base station BS-1 during sub-subframe sPDSCH-4 of the second subframe defined by the frequency resource of control information PDCCH-2 and the time resource of control information sPDCCH-4.

Operations of FIG. 13 may be repeated for any number of subframes, and/or for any number of sub-subframes per subframe.

Abbreviations
ACK Acknowledgement
ARQ Automatic Repeat reQuest
C-RNTI Cell Radio Network Temporary Identity
CRC Cyclic Redundancy Check
CP Cyclic Prefix
DL Downlink
DCI Downlink Control Information
DRX Discontinuous Reception
HARQ Hybrid Automatic Repeat reQuest
LTE Long Term Evolution
NDI New Data Indication
MCS Modulation and Coding Scheme
OFDM Orthogonal Frequency Division Multiple Access
PCFICH Physical Control Format Indicator Channel
PDCCH Physical Downlink Control Channel
PDSCH Physical Downlink Shared Channel
PHICH Physical HARQ Indication Channel
PUCCH Physical Uplink Control Channel
PUSCH Physical Uplink Shared Channel
PRB Physical Resource Block
RLC Radio Link Control
RRC Radio Resource Control
RAT Radio Access Technology
RA Resource Allocation
RBG Resource Block Group
RNTI Radio Network Temporary Identifier
RTT Round Trip Time
RV Redundancy Version
SC-FDMA Single Carrier-Frequency Division Multiple Access
SSF Sub-SubFrame
TDD Time Domain Division
TDS Time Domain Split
TTI Transmission Time Interval

EXAMPLE EMBODIMENTS

Embodiment 1

A method of operating a network node of a radio access network, the method comprising: transmitting first control information to a wireless terminal, wherein the first control information defines a frequency resource available for data communication with the wireless terminal over a subframe; after transmitting the first control information, transmitting second control information to the wireless terminal, wherein the second control information defines a time resource for a sub-subframe of the subframe; and providing communication of data between the network node and the wireless terminal during the sub-subframe of the subframe defined by the frequency resource of the first control information and the time resource of the second control information.

Embodiment 2

The method of Embodiment 1 wherein the wireless terminal is configured with a first identification and with a second identification different than the first identification, wherein transmitting the first control information comprises transmitting the first control information scrambled with the first identification, and wherein transmitting the second control information comprises transmitting the second control information scrambled with the second identification.

Embodiment 3

The method of Embodiment 2 wherein the wireless terminal is a first wireless terminal, wherein the first identification is a group identification, wherein a second wireless terminal is configured with the first identification, wherein the second identification is an individual identification for the first wireless terminal, wherein the second wireless terminal is configured with a third identification that is an individual identification for the second wireless terminal, and wherein transmitting the first control information comprises transmitting the first control information to the first and second wireless terminals.

Embodiment 4

The method of Embodiment 3, wherein the first identification comprises a Radio Network Temporary Identifier and wherein the second and third identifications comprise respective Cell Radio Network Temporary Identifiers.

Embodiment 5

The method of any of Embodiments 3-4, wherein the time resource is a first time resource, and wherein the sub-subframe is a first sub-subframe of the subframe, the method further comprising: after transmitting the second control information, transmitting third control information to the second wireless terminal, wherein the third control information defines a second time resource for a second sub-subframe of the subframe wherein transmitting the third control information comprises scrambling the third control information with the third identification that is the individual identification for the second wireless terminal; and providing communication of data between the network node and the second wireless terminal during the second sub-subframe of the subframe defined by the frequency resource of the first control information and the second time resource of the third control information.

Embodiment 6

The method of Embodiment 5 wherein the second sub-subframe is subsequent to the first sub-subframe.

Embodiment 7

The method of Embodiment 6 wherein a sum of durations of the first and second sub-subframes is less than a duration of the subframe.

Embodiment 8

The method of any of Embodiments 5-7, wherein the subframe is a first subframe, the method further comprising: after transmitting the third control information, transmitting fourth control information to the first and second wireless terminals, wherein the fourth control information defines a second frequency resource available for data communication with the first and second wireless terminals over the second subframe, wherein the fourth control information is scrambled with the first identification; after transmitting the fourth control information, transmitting fifth control information to the first wireless terminal, wherein the fifth control information defines a third time resource for a sub-subframe of the second subframe, wherein transmitting the fifth control information comprises scrambling the fifth control information with the second identification that is the individual identification for the first wireless terminal; and providing communication of data between the network node and the first wireless terminal during the sub-subframe of the second subframe defined by the second frequency resource of the fourth control information and third time resource of the fifth control information.

Embodiment 9

The method of Embodiment 8 wherein a duration of the first sub-subframe of the first subframe is different than a duration of the sub-subframe of the second subframe.

Embodiment 10

The method of any of Embodiments 1-4, wherein the time resource is a first time resource, wherein the subframe is a first subframe, wherein the frequency resource is a first frequency resource, wherein the first control information defines a second frequency resource different than the first frequency resource, and wherein transmitting the second control information comprises transmitting the second control information using the second frequency resource, the method further comprising: after transmitting the second control information, transmitting third control information to the wireless terminal, wherein the third control information defines a third frequency resource and a fourth frequency resource different than the third frequency resource; after transmitting the third control information, transmitting fourth control information to the wireless terminal using the fourth frequency resource wherein the fourth frequency resource is different than the second frequency resource, wherein the fourth control information defines a time resource for a sub-subframe of the second subframe; and providing communication of data between the network node and the wireless terminal during the sub-subframe of the second subframe defined by the third frequency resource of the third control information and the time resource of the fourth control information.

Embodiment 11

The method of Embodiment 10, wherein the first and third frequency resources are different.

Embodiment 12

The method of Embodiment 1, wherein the time resource is a first time resource, and wherein the subframe is a first subframe, the method further comprising: after transmitting the second control information, transmitting third control information to the wireless terminal, wherein the third control information defines a second time resource for a sub-subframe of the second subframe; and providing communication of data between the network node and the wireless terminal during the sub-subframe of the second subframe defined by the frequency resource of the first control information and the time resource of the third control information.

Embodiment 13

The method of Embodiment 12 wherein transmitting the first control information comprises transmitting the first control information via RRC and/or MAC signaling.

Embodiment 14

The method of any of Embodiments 12-13 wherein durations of the sub-subframes of the first and second subframes are different.

Embodiment 15

The method of any of Embodiments 12-14, wherein the wireless terminal is a first wireless terminal, the method further comprising: after transmitting the second control information, transmitting fourth control information to a second wireless terminal, wherein the fourth control information defines a fourth time resource for a second sub-subframe of the first subframe; and providing communication of data between the network node and the second wireless terminal during the second sub-subframe of the first subframe defined by the frequency resource of the first control information and the time resource of the fourth control information.

Embodiment 16

The method of any of Embodiments 12-15 wherein transmitting the second control information and transmitting the third control information comprise transmitting the second control information and transmitting the third control information using the frequency resource.

Embodiment 17

The method of any of Embodiments 12-15 wherein the frequency resource is a first frequency resource, and wherein transmitting the second control information and transmitting the third control information comprise transmitting the second control information and transmitting the third control information using a second frequency resource different than the first frequency resource.

Embodiment 18

The method of Embodiment 17 wherein the first control information defines the second frequency resource.

Embodiment 19

The method of any of Embodiments 1-18 wherein the frequency resource comprises a first frequency resource, and wherein transmitting the second control information comprises transmitting the second control information using a second frequency resource different than the first frequency resource.

Embodiment 20

The method of Embodiment 19 wherein the first control information defines the second frequency resource for the second control information.

Embodiment 21

The method of any of Embodiments 1-18 wherein transmitting the second control information comprises transmitting the second control information using the frequency resource.

Embodiment 22

The method of any of Embodiments 1-21 wherein transmitting the first control information comprises transmitting the first control information using a first control channel of the subframe, wherein transmitting the second control information comprises transmitting the second control information using a second control channel of the subframe, and wherein the second control channel is subsequent to the first control channel in the subframe.

Embodiment 23

The method of Embodiment 22 wherein a bandwidth of the first control channel is greater than a bandwidth of the second control channel.

Embodiment 24

The method of any of Embodiments 1-21 wherein transmitting the first control information comprises transmitting the first control information using radio resource control (RRC) and/or medium access control (MAC) signaling.

Embodiment 25

The method of any of Embodiments 1-24 wherein the subframe has a duration of 1 ms, and wherein the sub-subframe has a duration no greater than 0.5 ms.

Embodiment 26

The method of any of Embodiments 1-25 wherein the network node is a base station.

Embodiment 27

The method of any of Embodiments 1-26 wherein the second control information includes modulation and coding scheme (MCS) information, precoding information, HARQ ACK/NACK information, redundancy version information, new data information, and/or multiple input multiple output (MIMO) information, and wherein providing communication of data comprises providing communication of data during the sub-subframe using the modulation and coding scheme (MCS) information, the precoding information, the HARQ ACK/NACK information, the redundancy version information, the new data information, and/or the multiple input multiple output (MIMO) information.

Embodiment 28

A network node of a radio access network, the network node comprising: a communication interface configured to provide communication with one or more wireless terminals over a radio interface; and a processor coupled with the communication interface, wherein the processor is configured to perform operations of any of embodiments 1-27.

Embodiment 29

A network node of a radio access network, wherein the network node is adapted to perform operations of any of Embodiments 1-27.

Embodiment 30

A method of operating a wireless terminal in communication with a radio access network, the method comprising: receiving first control information from a network node of the radio access network, wherein the first control information defines a frequency resource available for data communication between the network node and the wireless terminal over a subframe; after receiving the first control information, receiving second control information from the network node, wherein the second control information defines a time resource for a sub-subframe of the subframe; and providing communication of data between the wireless terminal and the network node during the sub-subframe of the subframe defined by the frequency resource of the first control information and the time resource of the second control information.

Embodiment 31

The method of Embodiment 30 wherein the wireless terminal is configured with a first identification and with a second identification different than the first identification, wherein receiving the first control information comprises descrambling the first control information using the first identification, and wherein receiving the second control information comprises descrambling the second control information using the second identification.

Embodiment 32

The method of Embodiment 31 wherein the first identification is a group identification assigned to a plurality of wireless terminals, wherein the second identification is an individual identification for the first wireless terminal.

Embodiment 33

The method of Embodiment 32, wherein the first identification comprises a Radio Network Temporary Identifier and wherein the second identification comprises a Cell Radio Network Temporary Identifier.

Embodiment 34

The method of any of Embodiments 30-33, wherein the subframe is a first subframe, the method further comprising: after receiving the second control information, receiving third control information from the network node, wherein the third control information defines a second frequency resource available for data communication with the network node over the second subframe; after receiving the third control information, receiving fourth control information to the wireless terminal, wherein the fourth control information defines a second time resource for a sub-subframe of the second subframe; and providing communication of data between the wireless terminal and the network node during the sub-subframe of the second subframe defined by the second frequency resource of the third control information and second time resource of the fourth control information.

Embodiment 35

The method of any of Embodiments 30-33, wherein the time resource is a first time resource, wherein the subframe is a first subframe, wherein the frequency resource is a first frequency resource, wherein the first control information defines a second frequency resource different than the first frequency resource, and wherein receiving the second control information comprises receiving the second control information using the second frequency resource, the method further comprising: after receiving the second control information, receiving third control information from the network node, wherein the third control information defines a third frequency resource and a fourth frequency resource different than the third frequency resource; after receiving the third control information, receiving fourth control information from the network node using the fourth frequency resource wherein the fourth frequency resource is different than the second frequency resource, wherein the fourth control information defines a time resource for a sub-subframe of the second subframe; and providing communication of data between wireless terminal and the network node during the sub-subframe of the second subframe defined by the third frequency resource of the third control information and the time resource of the fourth control information.

Embodiment 36

The method of Embodiment 35, wherein the first and third frequency resources are different.

Embodiment 37

The method of Embodiment 30, wherein the time resource is a first time resource, and wherein the subframe is a first subframe, the method further comprising: after receiving the second control information, receiving third control information from the network node, wherein the third control information defines a second time resource for a sub-subframe of the second subframe; and providing communication of data between the wireless terminal and the network node during the sub-subframe of the second subframe defined by the frequency resource of the first control information and the time resource of the third control information.

Embodiment 38

The method of Embodiment 37 wherein receiving the first control information comprises receiving the first control information via RRC and/or MAC signaling.

Embodiment 39

The method of any of Embodiments 37-38 wherein durations of the sub-subframes of the first and second subframes are different.

Embodiment 40

The method of any of Embodiments 37-39 wherein receiving the second control information and receiving the third control information comprise receiving the second control information and receiving the third control information using the frequency resource.

Embodiment 41

The method of any of Embodiments 37-39 wherein the frequency resource is a first frequency resource, and wherein receiving the second control information and receiving the third control information comprise receiving the second control information and receiving the third control information using a second frequency resource different than the first frequency resource.

Embodiment 42

The method of Embodiment 41 wherein the first control information defines the second frequency resource.

Embodiment 43

The method of any of Embodiments 30-42 wherein the frequency resource comprises a first frequency resource, and wherein receiving the second control information comprises receiving the second control information using a second frequency resource different than the first frequency resource.

Embodiment 44

The method of Embodiment 43 wherein the first control information defines the second frequency resource for the second control information.

Embodiment 45

The method of any of Embodiments 30-42 wherein receiving the second control information comprises receiving the second control information using the frequency resource.

Embodiment 46

The method of any of Embodiments 30-45 wherein receiving the first control information comprises receiving the first control information using a first control channel of the subframe, wherein receiving the second control information comprises receiving the second control information using a second control channel of the subframe, and wherein the second control channel is subsequent to the first control channel in the subframe.

Embodiment 47

The method of Embodiment 46 wherein a bandwidth of the first control channel is greater than a bandwidth of the second control channel.

Embodiment 48

The method of any of Embodiments 30-45 wherein receiving the first control information comprises receiving the first control information using radio resource control (RRC) and/or medium access control (MAC) signaling.

Embodiment 49

The method of any of Embodiments 30-48 wherein the subframe has a duration of 1 ms, and wherein the sub-subframe has a duration no greater than 0.5 ms.

Embodiment 50

The method of any of Embodiments 30-49 wherein the network node is a base station.

Embodiment 51

The method of any of Embodiments 30-50 wherein the second control information modulation and coding scheme (MCS) information, precoding information, HARQ ACK/NACK information, redundancy version information, new data information, and/or multiple input multiple output (MIMO) information, and wherein providing communication of data comprises providing communication of data during the sub-subframe using the modulation and coding scheme (MCS) information, the precoding information, the HARQ ACK/NACK information, the redundancy version information, the new data information, and/or the multiple input multiple output (MIMO) information.

Embodiment 52

A wireless terminal comprising: a transceiver configured to provide radio communication with a radio access network over a radio interface; and a processor coupled with the transceiver, wherein the processor is configured to perform operations of any of Embodiments 30-50.

Embodiment 53

A wireless terminal adapted to perform operations of any of Embodiments 30-50.

Embodiment 54

A network node of a radio access network, the network node comprising: a control information communication module adapted to transmit first control information to a wireless terminal, wherein the first control information defines a frequency resource available for data communication with the wireless terminal over a subframe, and adapted to transmit second control information to the wireless terminal after transmitting the first control information, wherein the second control information defines a time resource for a sub-subframe of the subframe; and a data communication module adapted to provide communication of data between the network node and the wireless terminal during the sub-subframe of the subframe defined by the frequency resource of the first control information and the time resource of the second control information.

Embodiment 55

A wireless terminal configured for communication with a radio access network, the wireless terminal comprising: a control information communication module adapted to receive first control information from a network node of the radio access network, wherein the first control information defines a frequency resource available for data communication between the network node and the wireless terminal over a subframe, and adapted to receive second control information from the network node after receiving the first control information, wherein the second control information defines a time resource for a sub-subframe of the subframe; and a data communication module adapted to provide communication of data between the wireless terminal and the network node during the sub-subframe of the subframe defined by the frequency resource of the first control information and the time resource of the second control information.

Further Definitions

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows. Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

The invention claimed is:

1. A method of operating a network node of a radio access network, the method comprising:
  transmitting first control information to a wireless terminal, wherein the first control information defines a frequency resource available for data communication with the wireless terminal over a subframe;
  after transmitting the first control information, transmitting second control information to the wireless terminal, wherein the second control information defines a time resource for a sub-subframe of the subframe; and
  providing communication of data between the network node and the wireless terminal during the sub-subframe of the subframe defined by the frequency resource of the first control information and the time resource of the second control information.

2. The method of claim 1, wherein the wireless terminal is configured with a first identification and with a second identification different than the first identification, wherein transmitting the first control information comprises transmitting the first control information scrambled with the first identification, and wherein transmitting the second control information comprises transmitting the second control information scrambled with the second identification.

3. The method of claim 2, wherein the wireless terminal is a first wireless terminal, wherein the first identification is a group identification, wherein a second wireless terminal is configured with the first identification, wherein the second identification is an individual identification for the first wireless terminal, wherein the second wireless terminal is configured with a third identification that is an individual identification for the second wireless terminal, and wherein transmitting the first control information comprises transmitting the first control information to the first and second wireless terminals.

4. The method of claim 3, wherein the time resource is a first time resource, and wherein the sub-subframe is a first sub-subframe of the subframe, the method further comprising:
  after transmitting the second control information, transmitting third control information to the second wireless terminal, wherein the third control information defines a second time resource for a second sub-subframe of the subframe wherein transmitting the third control information comprises scrambling the third control information with the third identification that is the individual identification for the second wireless terminal; and providing communication of data between the network node and the second wireless terminal during the second sub-subframe of the subframe defined by the frequency resource of the first control information and the second time resource of the third control information.

5. The method of claim 4, wherein the subframe is a first subframe, the method further comprising:
after transmitting the third control information, transmitting fourth control information to the first and second wireless terminals, wherein the fourth control information defines a second frequency resource available for data communication with the first and second wireless terminals over the second subframe, wherein the fourth control information is scrambled with the first identification;
after transmitting the fourth control information, transmitting fifth control information to the first wireless terminal, wherein the fifth control information defines a third time resource for a sub-subframe of the second subframe, wherein transmitting the fifth control information comprises scrambling the fifth control information with the second identification that is the individual identification for the first wireless terminal; and
providing communication of data between the network node and the first wireless terminal during the sub-subframe of the second subframe defined by the second frequency resource of the fourth control information and third time resource of the fifth control information.

6. The method of claim 1, wherein the time resource is a first time resource, wherein the subframe is a first subframe, wherein the frequency resource is a first frequency resource, wherein the first control information defines a second frequency resource different than the first frequency resource, and wherein transmitting the second control information comprises transmitting the second control information using the second frequency resource, the method further comprising:
after transmitting the second control information, transmitting third control information to the wireless terminal, wherein the third control information defines a third frequency resource and a fourth frequency resource different than the third frequency resource;
after transmitting the third control information, transmitting fourth control information to the wireless terminal using the fourth frequency resource wherein the fourth frequency resource is different than the second frequency resource, wherein the fourth control information defines a time resource for a sub-subframe of the second subframe; and
providing communication of data between the network node and the wireless terminal during the sub-subframe of the second subframe defined by the third frequency resource of the third control information and the time resource of the fourth control information.

7. The method of claim 1, wherein the time resource is a first time resource, and wherein the subframe is a first subframe, the method further comprising:
after transmitting the second control information, transmitting third control information to the wireless terminal, wherein the third control information defines a second time resource for a sub-subframe of the second subframe; and
providing communication of data between the network node and the wireless terminal during the sub-subframe of the second subframe defined by the frequency resource of the first control information and the time resource of the third control information.

8. The method of claim 7, wherein the wireless terminal is a first wireless terminal, the method further comprising:
after transmitting the second control information, transmitting fourth control information to a second wireless terminal, wherein the fourth control information defines a fourth time resource for a second sub-subframe of the first subframe; and
providing communication of data between the network node and the second wireless terminal during the second sub-subframe of the first subframe defined by the frequency resource of the first control information and the time resource of the fourth control information.

9. The method of claim 1, wherein the frequency resource comprises a first frequency resource, and wherein transmitting the second control information comprises transmitting the second control information using a second frequency resource different than the first frequency resource.

10. The method of claim 1, wherein transmitting the second control information comprises transmitting the second control information using the frequency resource.

11. The method of claim 1, wherein transmitting the first control information comprises transmitting the first control information using a first control channel of the subframe, wherein transmitting the second control information comprises transmitting the second control information using a second control channel of the subframe, and wherein the second control channel is subsequent to the first control channel in the subframe.

12. The method of claim 1, wherein the second control information includes modulation and coding scheme (MCS) information, precoding information, HARQ ACK/NACK information, redundancy version information, new data information, and/or multiple input multiple output (MIMO) information, and wherein providing communication of data comprises providing communication of data during the sub-subframe using the modulation and coding scheme (MCS) information, the precoding information, the HARQ ACK/NACK information, the redundancy version information, the new data information, and/or the multiple input multiple output (MIMO) information.

13. A method of operating a wireless terminal in communication with a radio access network, the method comprising:
receiving first control information from a network node of the radio access network, wherein the first control information defines a frequency resource available for data communication between the network node and the wireless terminal over a subframe;
after receiving the first control information, receiving second control information from the network node, wherein the second control information defines a time resource for a sub-subframe of the subframe; and
providing communication of data between the wireless terminal and the network node during the sub-subframe of the subframe defined by the frequency resource of the first control information and the time resource of the second control information.

14. The method of claim 13, wherein the wireless terminal is configured with a first identification and with a second identification different than the first identification, wherein receiving the first control information comprises descrambling the first control information using the first identification, and wherein receiving the second control information comprises descrambling the second control information using the second identification.

15. The method of claim 14, wherein the first identification is a group identification assigned to a plurality of wireless terminals, wherein the second identification is an individual identification for the first wireless terminal.

16. The method of claim 13, wherein the subframe is a first subframe, the method further comprising:
   after receiving the second control information, receiving third control information from the network node, wherein the third control information defines a second frequency resource available for data communication with the network node over the second subframe;
   after receiving the third control information, receiving fourth control information from the network node, wherein the fourth control information defines a second time resource for a sub-subframe of the second subframe; and
   providing communication of data between the wireless terminal and the network node during the sub-subframe of the second subframe defined by the second frequency resource of the third control information and second time resource of the fourth control information.

17. The method of claim 13, wherein the time resource is a first time resource, wherein the subframe is a first subframe, wherein the frequency resource is a first frequency resource, wherein the first control information defines a second frequency resource different than the first frequency resource, and wherein receiving the second control information comprises receiving the second control information using the second frequency resource, the method further comprising:
   after receiving the second control information, receiving third control information from the network node, wherein the third control information defines a third frequency resource and a fourth frequency resource different than the third frequency resource;
   after receiving the third control information, receiving fourth control information from the network node using the fourth frequency resource wherein the fourth frequency resource is different than the second frequency resource, wherein the fourth control information defines a time resource for a sub-subframe of the second subframe; and
   providing communication of data between wireless terminal and the network node during the sub-subframe of the second subframe defined by the third frequency resource of the third control information and the time resource of the fourth control information.

18. The method of claim 13, wherein the time resource is a first time resource, and wherein the subframe is a first subframe, the method further comprising:
   after receiving the second control information, receiving third control information from the network node, wherein the third control information defines a second time resource for a sub-subframe of the second subframe; and
   providing communication of data between the wireless terminal and the network node during the sub-subframe of the second subframe defined by the frequency resource of the first control information and the time resource of the third control information.

19. The method of claim 13, wherein the frequency resource comprises a first frequency resource, and wherein receiving the second control information comprises receiving the second control information using a second frequency resource different than the first frequency resource.

20. The method of claim 13, wherein receiving the first control information comprises receiving the first control information using a first control channel of the subframe, wherein receiving the second control information comprises receiving the second control information using a second control channel of the subframe, and wherein the second control channel is subsequent to the first control channel in the subframe.

21. The method of claim 13, wherein the second control information includes modulation and coding scheme (MCS) information, precoding information, HARQ ACK/NACK information, redundancy version information, new data information, and/or multiple input multiple output (MIMO) information, and wherein providing communication of data comprises providing communication of data during the sub-subframe using the modulation and coding scheme (MCS) information, the precoding information, the HARQ ACK/NACK information, the redundancy version information, the new data information, and/or the multiple input multiple output (MIMO) information.

22. A network node of a radio access network, the network node comprising:
   a communication interface configured to provide communication with one or more wireless terminals over a radio interface; and
   a processor coupled with the communication interface, wherein the processor is configured to,
      transmit first control information to a wireless terminal, wherein the first control information defines a frequency resource available for data communication with the wireless terminal over a subframe,
      transmit second control information to the wireless terminal after transmitting the first control information, wherein the second control information defines a time resource for a sub-subframe of the subframe, and
      provide communication of data between the network node and the wireless terminal during the sub-subframe of the subframe defined by the frequency resource of the first control information and the time resource of the second control information.

23. The network node of claim 22, wherein the wireless terminal is configured with a first identification and with a second identification different than the first identification, wherein transmitting the first control information comprises transmitting the first control information scrambled with the first identification, and wherein transmitting the second control information comprises transmitting the second control information scrambled with the second identification.

24. The network node of claim 22, wherein the time resource is a first time resource, wherein the subframe is a first subframe, wherein the frequency resource is a first frequency resource, wherein the first control information defines a second frequency resource different than the first frequency resource, wherein transmitting the second control information comprises transmitting the second control information using the second frequency resource, and wherein the processor is further configured to,
   transmit third control information to the wireless terminal after transmitting the second control information, wherein the third control information defines a third frequency resource and a fourth frequency resource different than the third frequency resource,
   transmit fourth control information to the wireless terminal using the fourth frequency resource after transmitting the third control information, wherein the fourth frequency resource is different than the second frequency resource, and wherein the fourth control information defines a time resource for a sub-subframe of the second subframe, and provide communication of data between the network node and the wireless terminal during the sub-subframe of the second subframe defined by the third frequency resource of the third control information and the time resource of the fourth control information.

25. The network node of claim 22, wherein the time resource is a first time resource, wherein the subframe is a first subframe, and wherein the processor is further configured to, transmit third control information to the wireless terminal after transmitting the second control information, wherein the third control information defines a second time resource for a sub-subframe of the second subframe, and provide communication of data between the network node and the wireless terminal during the sub-subframe of the second subframe defined by the frequency resource of the first control information and the time resource of the third control information.

26. The network node of claim 22, wherein the frequency resource comprises a first frequency resource, and wherein transmitting the second control information comprises transmitting the second control information using a second frequency resource different than the first frequency resource.

27. A wireless terminal comprising:

a transceiver configured to provide radio communication with a radio access network over a radio interface; and a processor coupled with the transceiver, wherein the processor is configured to, receive first control information from a network node of the radio access network, wherein the first control information defines a frequency resource available for data communication between the network node and the wireless terminal over a subframe, receive second control information from the network node after receiving the first control information, wherein the second control information defines a time resource for a sub-subframe of the subframe, and provide communication of data between the wireless terminal and the network node during the sub-subframe of the subframe defined by the frequency resource of the first control information and the time resource of the second control information.

28. The wireless terminal of claim 27, wherein the wireless terminal is configured with a first identification and with a second identification different than the first identification, wherein receiving the first control information comprises descrambling the first control information using the first identification, and wherein receiving the second control information comprises descrambling the second control information using the second identification.

29. The wireless terminal of claim 27, wherein the subframe is a first subframe, and wherein the processor is further configured to, receive third control information from the network node after receiving the second control information, wherein the third control information defines a second frequency resource available for data communication with the network node over the second subframe, receive fourth control information from the network node after receiving the third control information, wherein the fourth control information defines a second time resource for a sub-subframe of the second subframe, and provide communication of data between the wireless terminal and the network node during the sub-subframe of the second subframe defined by the second frequency resource of the third control information and second time resource of the fourth control information.

30. The wireless terminal of claim 27, wherein the time resource is a first time resource, wherein the subframe is a first subframe, wherein the frequency resource is a first frequency resource, wherein the first control information defines a second frequency resource different than the first frequency resource, wherein receiving the second control information comprises receiving the second control information using the second frequency resource, and wherein the processor is further configured to, receive third control information from the network node after receiving the second control information, wherein the third control information defines a third frequency resource and a fourth frequency resource different than the third frequency resource, receive fourth control information from the network node using the fourth frequency resource after receiving the third control information, wherein the fourth frequency resource is different than the second frequency resource, wherein the fourth control information defines a time resource for a sub-subframe of the second subframe, and provide communication of data between wireless terminal and the network node during the sub-subframe of the second subframe defined by the third frequency resource of the third control information and the time resource of the fourth control information.

31. The wireless terminal of claim 27, wherein the time resource is a first time resource, wherein the subframe is a first subframe, and wherein the processor is further configured to, receive third control information from the network node after receiving the second control information, wherein the third control information defines a second time resource for a sub-subframe of the second subframe, and provide communication of data between the wireless terminal and the network node during the sub-subframe of the second subframe defined by the frequency resource of the first control information and the time resource of the third control information.

* * * * *